United States Patent
Bednar et al.

(10) Patent No.: US 6,336,312 B1
(45) Date of Patent: Jan. 8, 2002

(54) GANG-TYPE ROTARY LAWN MOWER WITH MULTIPLE REAR ROLLERS

(75) Inventors: Richard D. Bednar, Johnson; Randal S. Knurr, Waterford, both of WI (US)

(73) Assignee: Textron Inc., Providence, RI (US)

(*) Notice: Subject to any disclaimer, the term of this patent is extended or adjusted under 35 U.S.C. 154(b) by 0 days.

(21) Appl. No.: 09/643,697

(22) Filed: Aug. 22, 2000

Related U.S. Application Data

(63) Continuation-in-part of application No. 09/546,145, filed on Apr. 10, 2000, which is a continuation of application No. 08/794,141, filed on Feb. 3, 1997, now Pat. No. 6,047,530.

(51) Int. Cl.$^7$ .............................................. A01D 34/66
(52) U.S. Cl. .............................................. 56/6; 56/13.6
(58) Field of Search .................. 56/6, 7, 13.6, 13.7, 56/13.8, 255, 295, DIG. 3, DIG. 9, DIG. 14

(56) References Cited

U.S. PATENT DOCUMENTS

| | | |
|---|---|---|
| 1,961,710 A | 6/1934 | Pol |
| 2,504,259 A | 4/1950 | Ford |
| 2,936,561 A | 5/1960 | Grimes |
| 3,070,938 A | 1/1963 | Winget |
| 3,118,266 A | 1/1964 | Colburn |
| 3,135,079 A | 6/1964 | Dunn |
| 4,308,713 A | 1/1982 | James |
| 4,901,507 A | 2/1990 | Cracraft |
| 5,137,100 A | 8/1992 | Scott et al. |
| 5,280,695 A | 1/1994 | Nunes, Jr. et al. |
| 5,293,729 A | 3/1994 | Curry et al. |
| 5,297,378 A | 3/1994 | Smith |
| 5,343,680 A | 9/1994 | Reichen et al. |
| 5,355,665 A | 10/1994 | Peter |
| 5,412,932 A | 5/1995 | Schueler |
| 5,423,565 A | 6/1995 | Smith |
| 5,481,857 A | 1/1996 | Umemoto et al. |
| 5,497,604 A | 3/1996 | Lonn |
| 6,047,530 A | 4/2000 | Bednar |

FOREIGN PATENT DOCUMENTS

| | | |
|---|---|---|
| EP | 0342700 | 11/1989 |
| NL | 7804519 | 8/1978 |
| WO | 88/05998 | 8/1988 |

OTHER PUBLICATIONS

Mountfield "Domestic Grass Machinery" (Date unknown).
Turf Blazer 1040 Diesel, Howard Price Turf Equipment (advertising brochure) (Date unknown).

(List continued on next page.)

Primary Examiner—Robert E. Pezzuto
(74) Attorney, Agent, or Firm—Harness, Dickey & Pierce PLC

(57) ABSTRACT

A gang-type rotary lawn mower including a frame supported by wheels for movement over the ground, a power source which is mounted on the frame and which drives at least two of the wheels, an operator's seat mounted on the frame, a steering system enabling the operator to steer the lawn mower, at least two side-by-side front rotary cutting deck assemblies mounted on the frame, the front deck assemblies defining a gap between adjacent front deck assemblies, and at least one rear rotary cutting deck assembly mounted on the frame behind the front deck assemblies, each rear deck assembly being aligned with a respective gap between adjacent front deck assemblies, each of the front and rear deck assemblies including a single-spindle mulching deck defining a downwardly opening space, a single spindle mounted for rotation about a generally vertical axis within the space, and at least one cutting blade mounted on the spindle for rotation therewith.

27 Claims, 18 Drawing Sheets

OTHER PUBLICATIONS

Nunes Rotary Mower, John Deere 3364 Deck Attachment; Nunes Manufacturing, Inc.

Steiner Turf Equipment Product Catalogue, 1997, p. 14.

"80–81 Owners Manual" (advertising brochure) published by Steiner in 1981.

"Jacobson Textron HR–5111–4WD Hydraulic Rotary Mower" (advertising brochure) published by Jacobson Div. Of Textron, Inc. in 1994.

"Groundsmaster® 580–D Mowers" (advertising brochure) published by Toro (date unknown).

"The Articulator", Model 425D (advertising brochure) published by LasTec, Inc. (date unknown).

"The Articulator", Model 325ER (advertising brochure) published by LasTec, Inc. (date unknown).

"The Articulator", Model 325E (advertising brochure) published by LasTec, Inc. (date unknown).

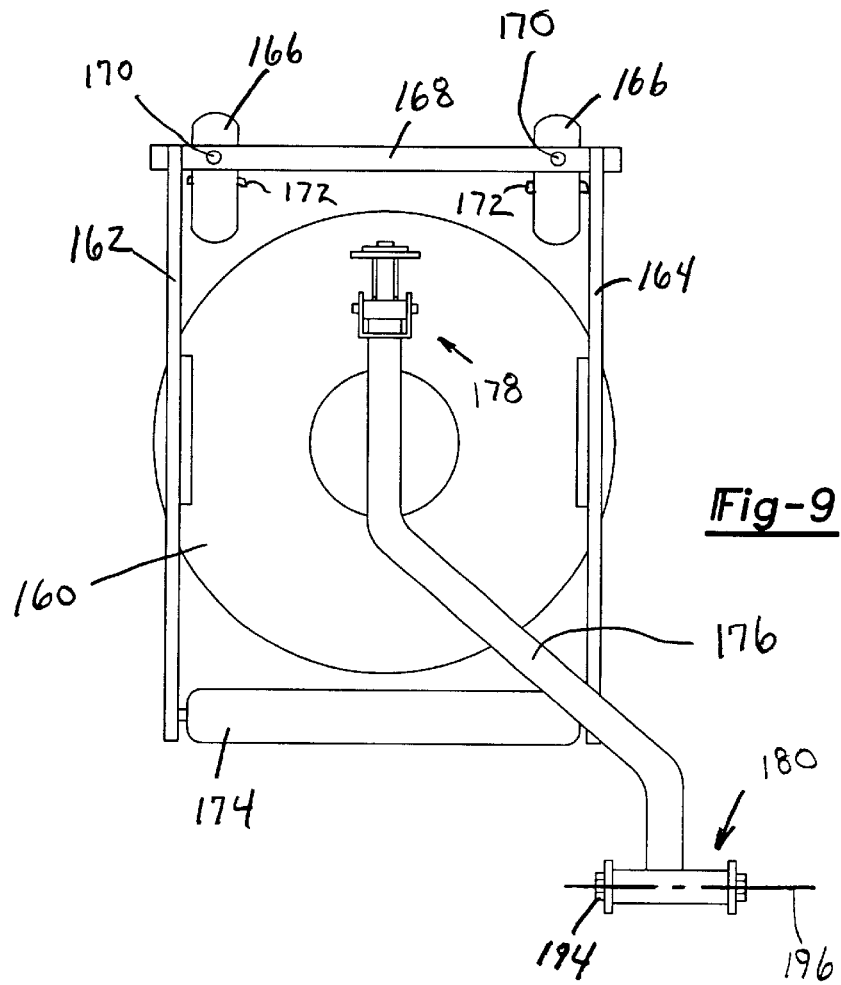
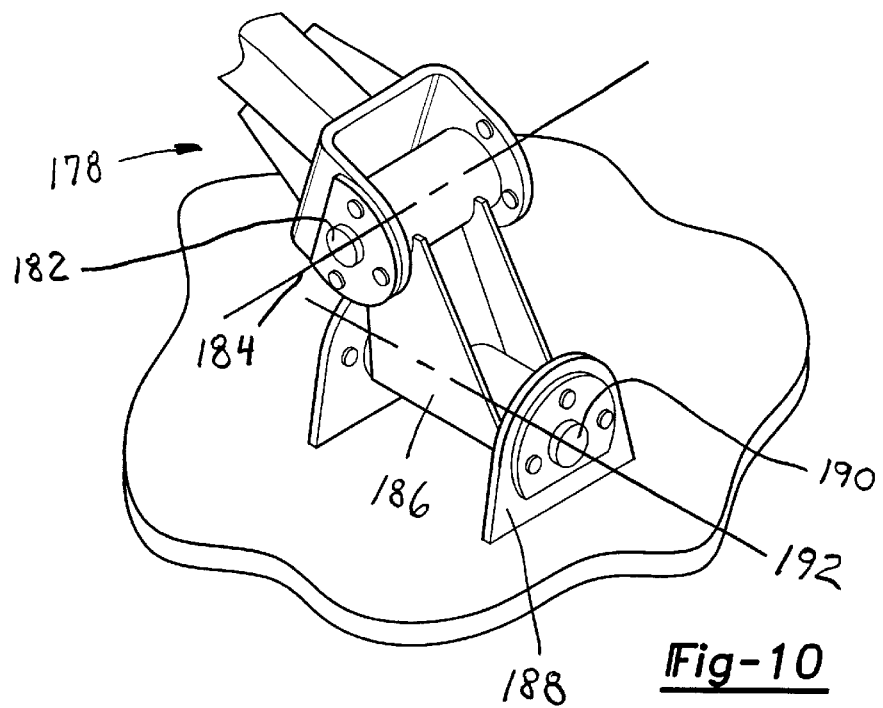

GANG-TYPE ROTARY LAWN MOWER WITH MULTIPLE REAR ROLLERS

RELATED APPLICATIONS

This patent application is a continuation-in-part of U.S. Ser. No. 09/546,145, filed Apr. 10, 2000, which is a continuation of U.S. Ser. No. 08/794,141, filed Feb. 3, 1997, now U.S. Pat. No. 6,047,530, issued Apr. 11, 2000.

BACKGROUND OF THE INVENTION

The invention relates to rotary lawn mowers and to gang-type lawn mowers. Historically, reel mowers have been used to cut golf course roughs. It is generally recognized that rotary mowers are better suited for cutting tall grass, where scalping is not a problem, while reel mowers are better for shorter cutting. A gang of reels can be either attached directly to the frame on which the operator rides, or pulled behind a tractor. Pull-behind or tow-behind rotary gangs are also known. These can be driven either by a power takeoff or by a separate engine. Tow-behind gangs, whether reel or rotary, are generally undesirable for cutting a golf course rough because close trimming is difficult. Thus, rotary mowers have not been used to cut golf course roughs, which require close trimming and the ability to cut undulating terrain at a relatively short length.

SUMMARY OF THE INVENTION

The invention provides a gang-type rotary lawn mower suitable for cutting a golf course rough. This is a tremendous improvement over the known prior art, because a rotary mower typically requires substantially less maintenance than a reel mower. The lawn mower has single-spindle cutting decks attached directly to the frame on which the operator rides, with a front row of two or more cutting decks in front of the front wheels, and with a rear row of one or more cutting decks between the front and rear wheels. The invention also provides an improved arrangement for mounting a rotary cutting deck on a lawn mower frame. Each deck is mounted on its own lifting arm so that the deck can move vertically relative to the frame and can pivot relative to the frame about three mutually perpendicular axes.

More particularly, the invention provides a gang-type rotary lawn mower comprising a frame supported by front and rear wheels, an operator's seat mounted on the frame, at least two side-by-side front cutting deck assemblies mounted on the frame in front of the front wheels, and at least one rear cutting deck assembly mounted on the frame behind the front wheels and in front of the rear wheels. Each of the front and rear deck assemblies includes a pair of laterally-spaced, generally vertically-extending side plates, front wheels supporting the side plates for movement over the ground, and a rear roller extending between the side plates and supporting the side plates for movement over the ground. Each deck assembly also includes a single-spindle cutting deck located between the side plates and in front of the roller, the deck being mounted on the side plates such that the height of the deck relative to the ground is adjustable. The roller extends across substantially the entire width of the deck. The roller resists scalping and stripes the grass, both of which are aesthetically desirable.

Each deck assembly is connected to the frame by a generally L-shaped, horizontally-extending lifting arm operable to lift the deck assembly relative to the frame. Each deck assembly is connected to the frame by its own lifting arm. Each lifting arm has an inner end pivotally connected to the frame. A cross member is mounted on the outer end of the lifting arm for pivotal movement about a generally vertical axis and about a generally horizontal axis extending in the forward-rearward direction. One end of the cross member is connected to one of the deck assembly side plates for pivotal movement about a generally horizontal, laterally-extending axis adjacent the forward ends of the side plates, and the other end of the cross member is connected to the other side plate for pivotal movement about the same axis.

This construction enables the lawn mower to cut the undulating terrain of a golf course rough and to be controlled for close trimming. Also, as mentioned above, the lawn mower requires much less maintenance than the reel mowers historically used to cut a golf course rough.

Other features and advantages of the invention will become apparent to those skilled in the art upon review of the following detailed description, claims and drawings.

BRIEF DESCRIPTION OF THE DRAWINGS

FIG. 9 is a top plan view of a cutter assembly of the present invention;

FIG. 10 is a perspective view of a lifting arm and cutting deck interconnection;

Figure 1:
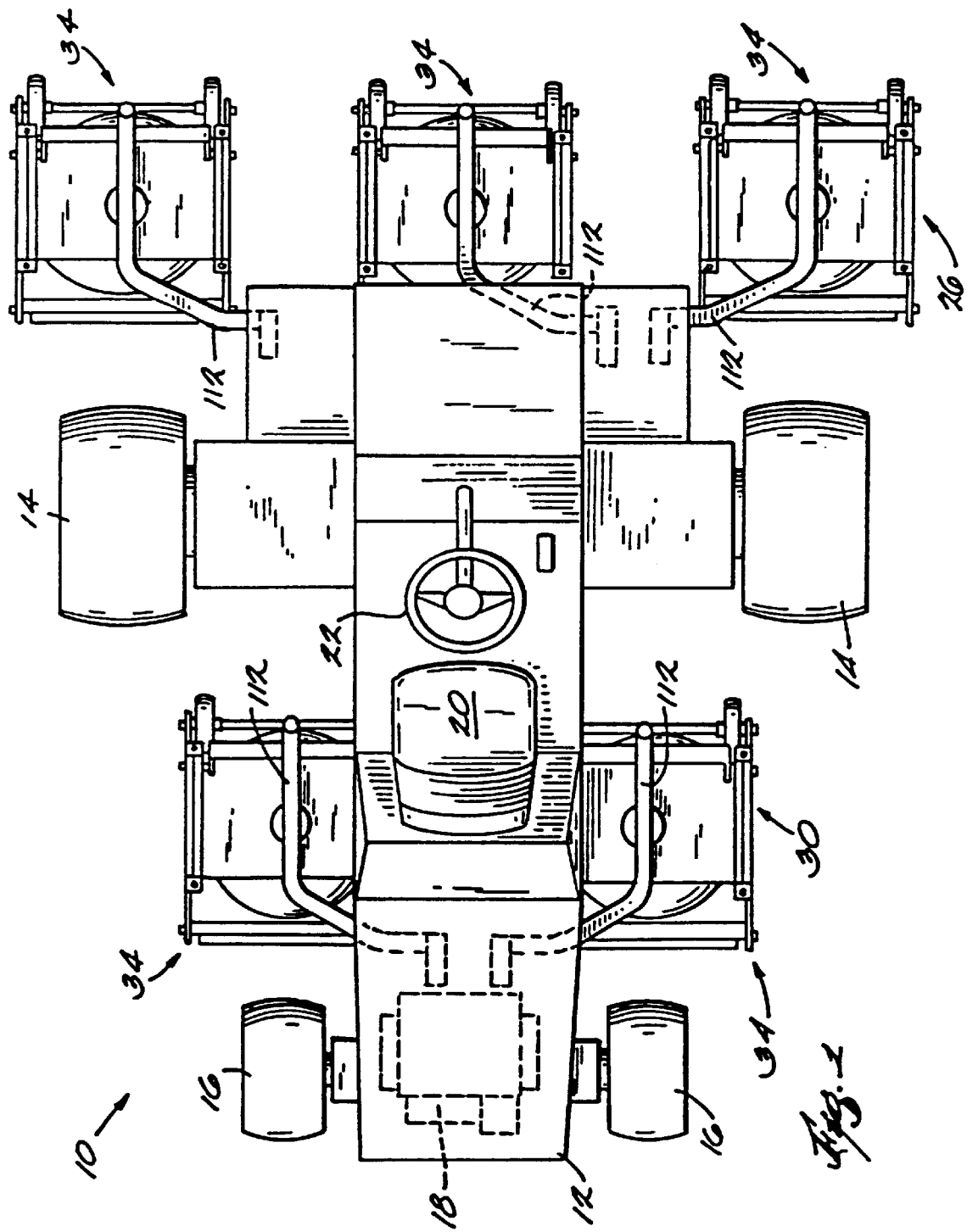
FIG. 1 is a top plan view of a lawn mower embodying the invention.
Figure 2:
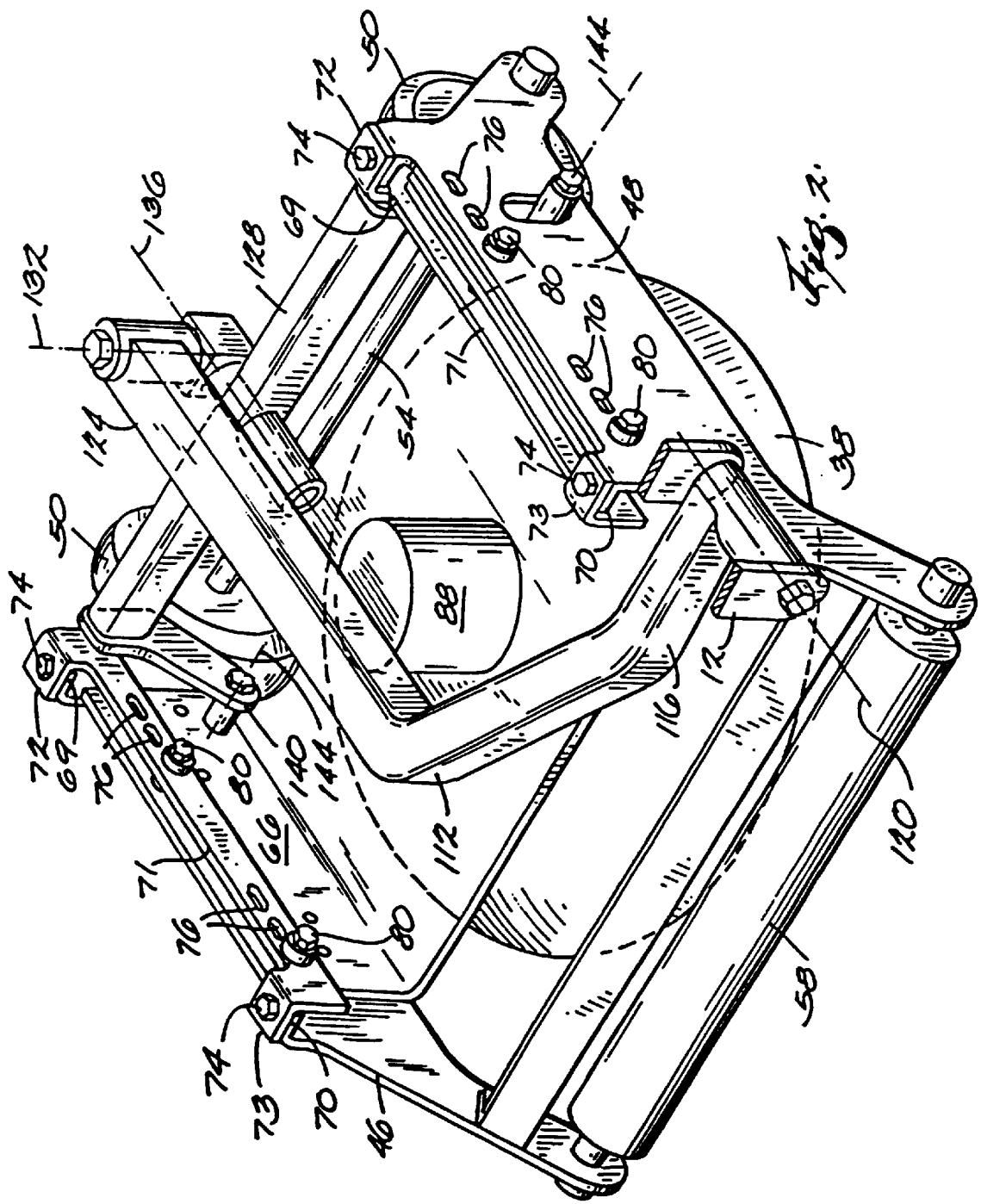
FIG. 2 is a perspective view of a cutting deck assembly.

Before certain embodiments of the invention are explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION OF THE PREFERRED EMBODIMENTS

A lawn mower 10 embodying the invention is illustrated in FIG. 1. Except as described below, the lawn mower 10 is identical to the lawn mower disclosed in U.S. patent application Ser. No. 08/787,384, filed Jan. 22, 1997, titled "PARALLEL-SERIES FOUR-WHEEL-DRIVE HYDRAULIC CIRCUIT FOR A RIDING LAWN MOWER" and assigned to the assignee hereof. The lawn mower 10 comprises a frame 12 (partially shown in FIGS. 2–5) supported by front wheels 14 and rear wheels 16 for movement over the ground. While the illustrated lawn mower 10 is rear-steering and has four-wheel drive, it should be understood that the invention is applicable to front-steering or two-wheel-drive lawn mowers.

The lawn mower 10 further comprises a power source 18 supported by the frame 12. The power source may be any type known in the art, such as a gasoline-powered, internal-combustion engine. The engine drives a hydraulic pump (not shown) that supplies hydraulic fluid to hydraulic motors (not shown) drivingly connected to the wheels 14 and 16. The lawn mower 10 further comprises an operator's seat 20, and a conventional steering system, including a steering wheel 22, enabling the operator to steer the lawn mower 10. In the illustrated construction, the steering system is hydraulic and is connected to the rear wheels 16 to steer the lawn mower 10.

The lawn mower 10 further comprises front and rear rows 26 and 30, respectively, of cutting deck assemblies 34. More particularly, in the illustrated construction, the lawn mower 10 has three side-by-side front cutting deck assemblies 34 in front of the front wheels 14, and two rear cutting deck assemblies 34 behind the front wheels 14 and in front of the rear wheels 16. As is known in the art, each rear deck assembly 34 is aligned with the gap between two adjacent front deck assemblies 34.

Figure 3:
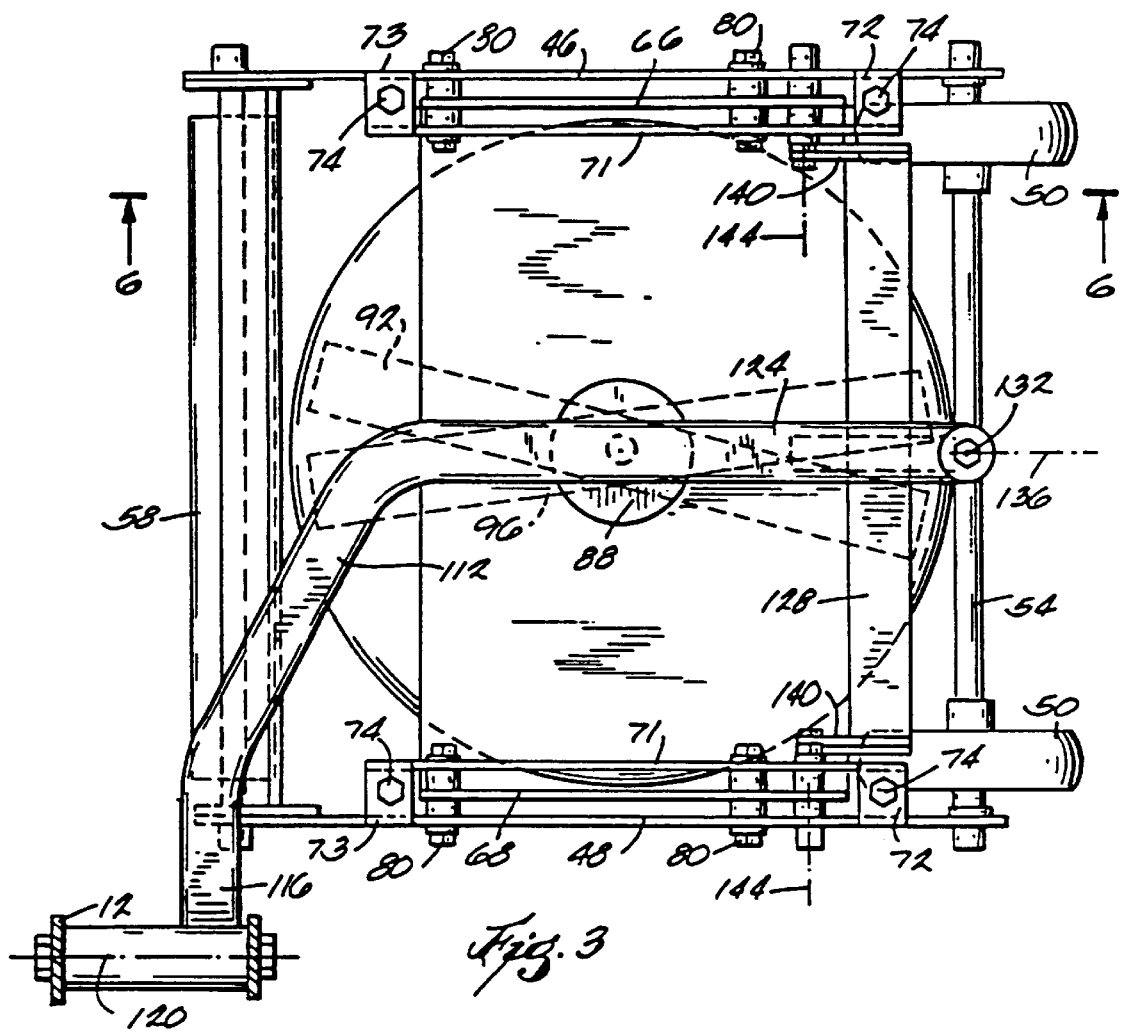
FIG. 3 is a top plan view of the cutting deck assembly.
Figure 4:
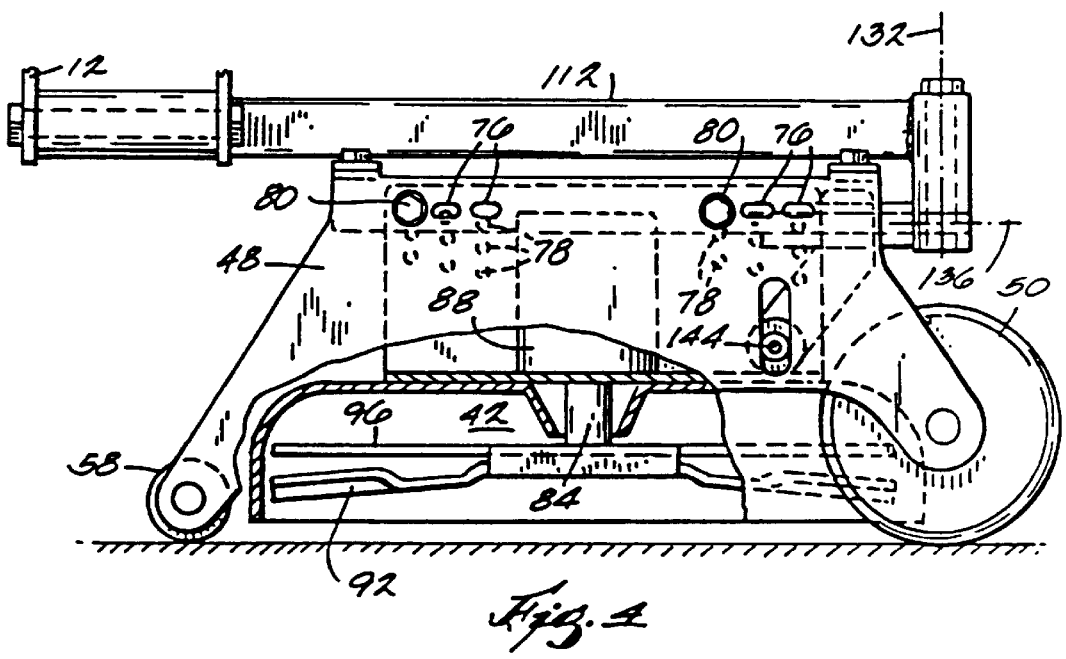
FIG. 4 is a side elevational view of the cutting deck assembly.
Figure 5:
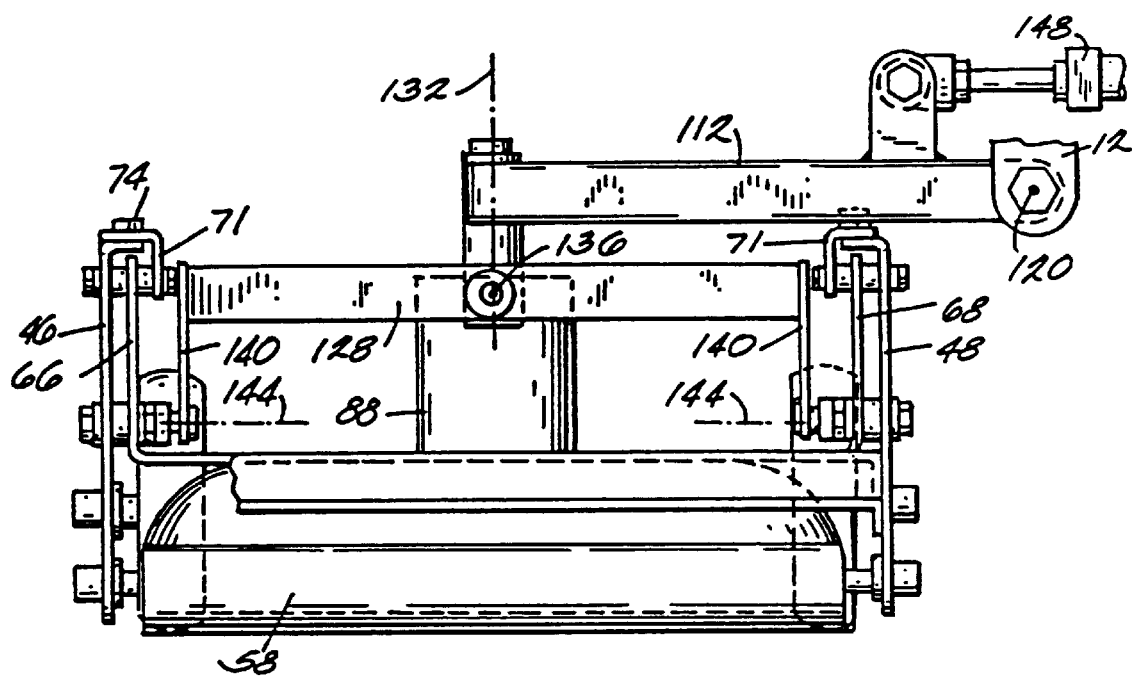
FIG. 5 is a rear elevational view of the cutting deck assembly.

Each of the cutting deck assemblies 34 includes (see FIGS. 2–5) a single-spindle mulching deck 38 defining a downwardly opening space 42 (FIG. 4). The deck 38 is located between and supported by a pair of laterally-spaced, generally vertically-extending side plates 46 and 48. The term "lateral" is used herein to mean the direction from one side of the lawn mower to the other, i.e., perpendicular to the forward-rearward direction. Two front wheels 50 rotate about an axle 54 (FIGS. 2 and 3) extending between the side plates 46 and 48 in front of the deck 38, such that each front wheel 50 supports one of the side plates 46 and 48 and the deck 38 for movement over the ground. A rear roller 58 extends between the side plates 46 and 48 and also supports the side plates 46 and 48 and the deck 38 for movement over the ground. The roller 58 is behind the deck 38 and extends across substantially the entire width of the deck 38. The roller 58 resists scalping and stripes the grass.

Figure 6:
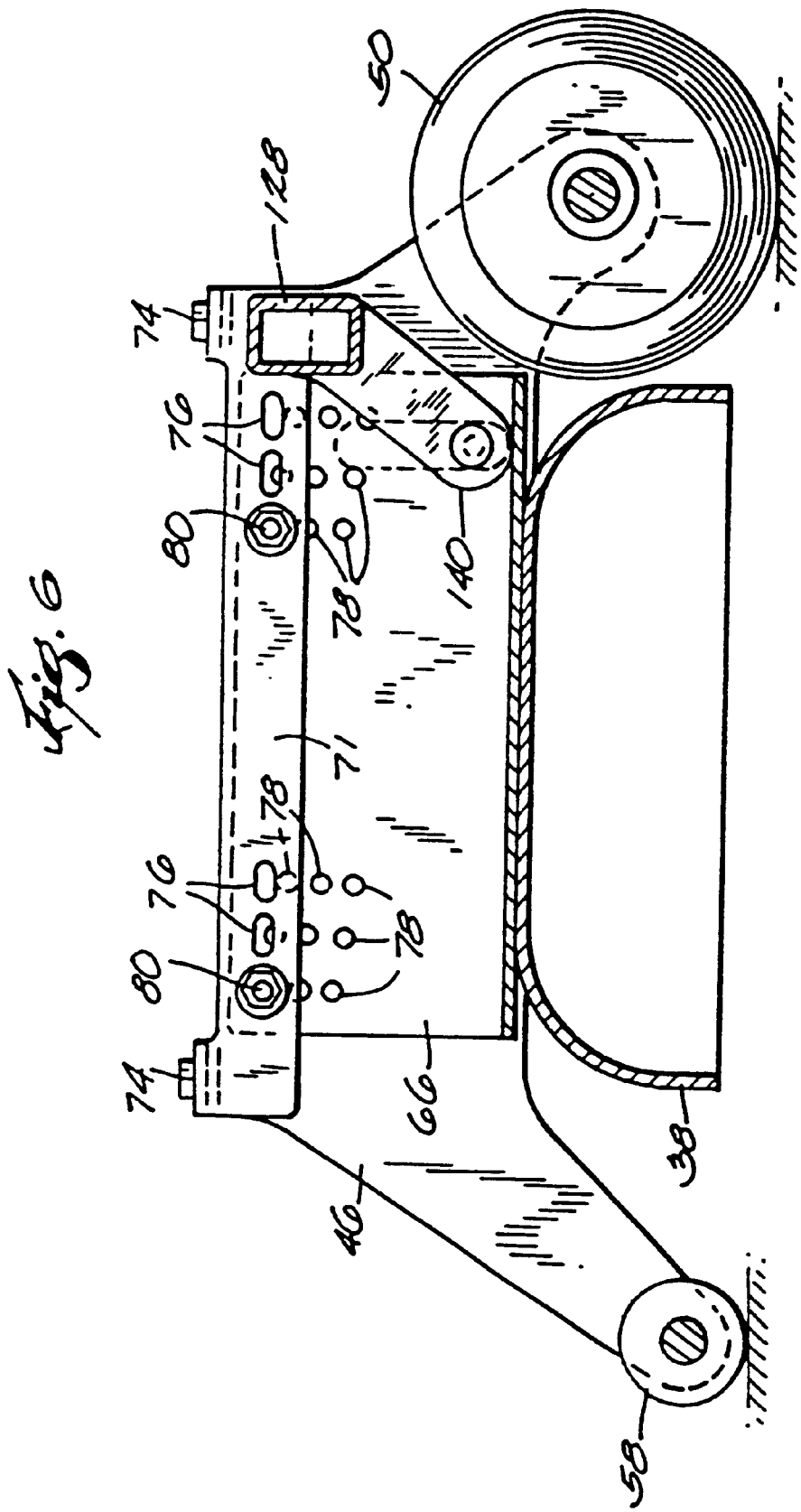
FIG. 6 is a view taken along line 6—6 in FIG. 3.

The deck 38 is mounted on the side plates 46 and 48 such that the height of the deck 38 relative to the ground is adjustable. In the illustrated construction, the deck 38 includes spaced deck plates 66 and 68 (FIGS. 3 and 5) extending upwardly adjacent the side plates 46 and 48, respectively. The upper end of each side plate 46 or 48 has thereon (see FIG. 2) generally horizontal, inwardly-extending ears 69 and 70, with the ear 69 adjacent the front of the side plate and the ear 70 adjacent the rear of the side plate. Fixed to the ears 69 and 70 of each side plate 46 or 48 is an elongated plate member 71 having outwardly-extending ears 72 and 73 respectively secured to the ears 69 and 70 by suitable means such as bolts or screws 74. Each side plate 46 or 48 and the corresponding plate member 71 has therein (see FIGS. 4 and 6) a series of holes 76. Each of the deck plates 66 and 68 has therein several vertically-spaced series of holes 78. Bolts 80 extending through holes 76 in the side plates 46 and 48 and in the plate members 71 and through holes 78 in the deck plates 66 and 68 secure the deck 38 to the side plates 46 and 48. The height of the deck 38 is adjusted by changing the holes 78 in the deck plates 66 and 68 and/or the holes in the side plates 46 and 48 and in the plate members 71 through which the bolts 80 extend.

A single spindle 84 (FIG. 4) is mounted for rotation about a generally vertical axis within the space 42 defined by the deck 38. The spindle 84 is driven by a hydraulic motor 88 on top of the deck 38. The above-mentioned pump supplies hydraulic fluid to the motor 88. It should be understood that other means could be used to drive the spindle 84.

A set of cutting blades is mounted on the spindle 84 for rotation therewith. In the illustrated construction, as shown in FIGS. 3 and 4, each blade set includes a lower, leading blade 92 and an upper, trailing blade 96. The leading blade 92 has a leading cutting edge and an upwardly angled trailing edge or lift. Preferably, the lift of the leading blade 92 is angled upwardly at an angle of approximately forty-five degrees. The trailing blade 96 has a leading cutting edge for cutting clippings deflected upwardly by the lift of the leading blade 92. The blades are preferably identical to those disclosed in U.S. patent application Ser. No. 08/787,382, filed Jan. 22, 1997, titled "ROTARY LAWN MOWER MULCHING DECK" and assigned to the assignee hereof. In alternative embodiments of the invention, different blade arrangements can be employed.

Each of the deck assemblies 34 is mounted on the frame 12 by a generally L-shaped, horizontally-extending lifting arm 112, such that each deck assembly is mounted on its own lifting arm 112. The lifting arm 112 has (see FIGS. 2 and 3) a laterally-extending inner leg 116 with an inner end connected to the frame 12 for pivotal movement about a generally horizontal axis 120 extending in the forward-rearward direction. The arm 112 also has an outer leg 124 extending in the forward-rearward direction. A cross member 128 is mounted on the outer end of the outer leg 124 for pivotal movement about a generally vertical axis 132 and about a generally horizontal axis 136 extending in the forward-rearward direction. Each of the opposite, laterally-spaced ends of the cross member 128 has thereon (see FIGS. 2, 3, 5 and 6) a downwardly and slightly rearwardly extending arm 140. The lower end of one arm 140 is connected to the side plate 46 for pivotal movement about a generally horizontal, laterally-extending axis 144 adjacent the forward ends of the side plates 46 and 48. The lower end of the other arm 140 is connected to the side plate 48 for pivotal movement about the axis 144.

A hydraulic assembly 148 (partially shown only in FIG. 5) connected between the arm 112 and the frame 12 pivots the arm about the axis 120 for lifting and lowering the deck 38. When the deck is lowered for cutting, the hydraulic assembly allows the lifting arm to "float," thereby allowing the deck 38 to move vertically relative to the frame 12. The connection of the deck 38 to the arm 112 via the cross member 128 allows the deck 38 to pivot relative to the frame 12 about the three mutually perpendicular axes 132, 136 and 144. This mounting arrangement enables the deck 38 to adjust to undulating terrain, thereby substantially avoiding scalping.

Figure 7:
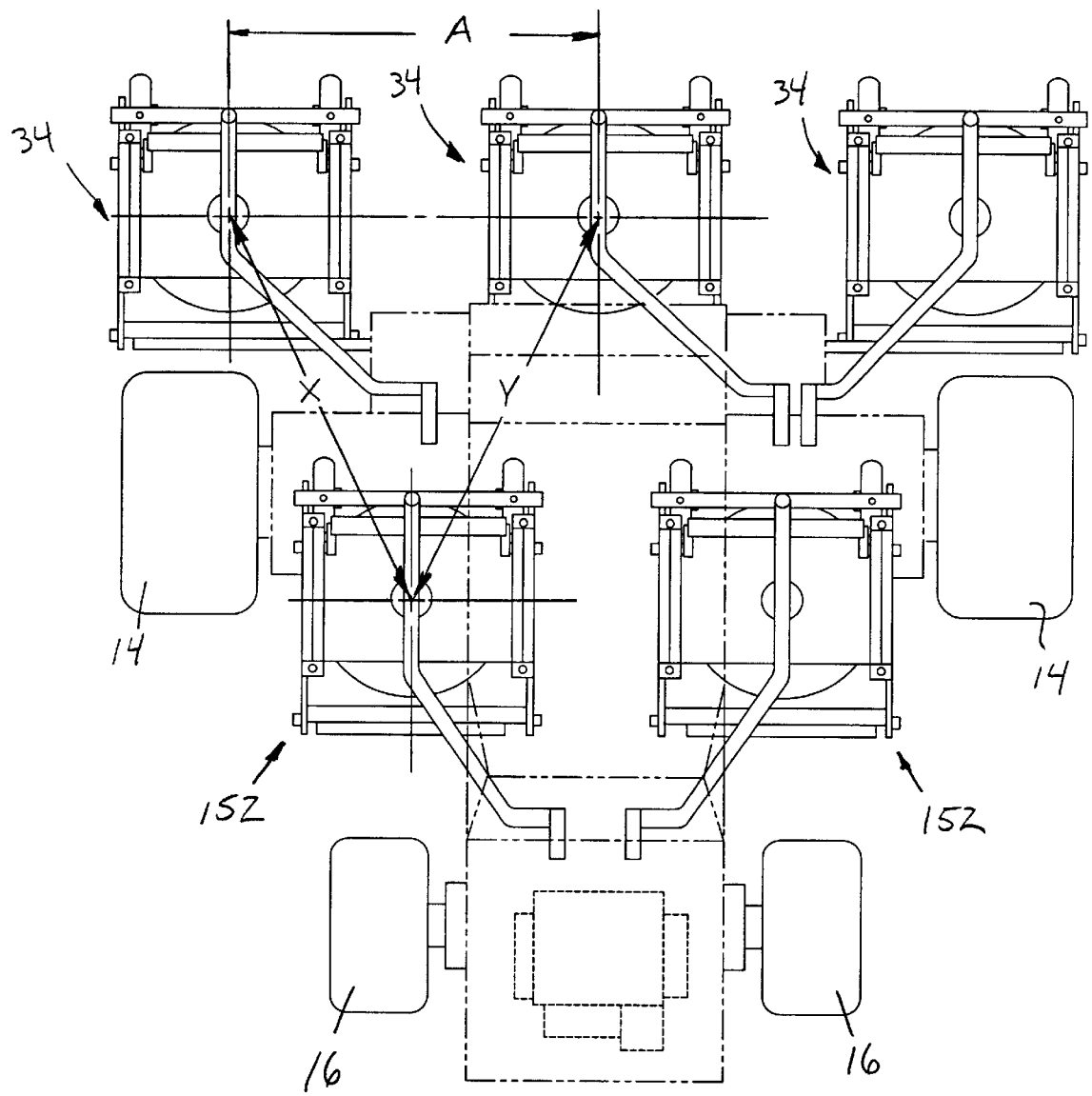
FIG. 7 is a top plan view of another embodiment of the present invention.

With reference to FIG. 7, an alternate lawn mower embodiment is depicted at reference numeral 150. It should be appreciated that lawn mower 150 includes common components and functions substantially similarly to lawn mower 10. Accordingly, similar components will be identified with like reference numerals. Lawn mower 150 preferably includes three side-by-side front cutting deck assemblies 34 in front of the wheels 14 and two rear cutting deck assemblies 152 positioned between the front wheels 14 and in front of the rear wheels 16. Each of the rear cutting deck assemblies 152 is positioned within the gap between two adjacent front deck assemblies 34. Rear deck assemblies 152 are substantially similar to cutting deck assemblies 34. However, cutting deck assemblies 152 are positioned adjacent one another between the front wheels. The placement of rear cutting deck assemblies 152 closer to front deck assemblies 34 allows for a reduction in lawn mower wheel base and overall length. Accordingly, lawn mower weight may be decreased while maneuverability is increased. Specifically, by closely packaging rear deck assemblies 152 with front deck assemblies 34 the turning radius of the lawn mower may be decreased without introducing strips of uncut grass. By way of example and without limitation, the distance between any two adjacent cutting deck centers, X and Y, varies between 1 and 2.5 units of cutting deck diameter, D. Additionally, as forward cutting deck assemblies are spaced apart a distance A, the ratio of distance X to distance A (X/A) and distance Y to distance A (Y/A) varies between 1 and 1.6.

Figure 8:
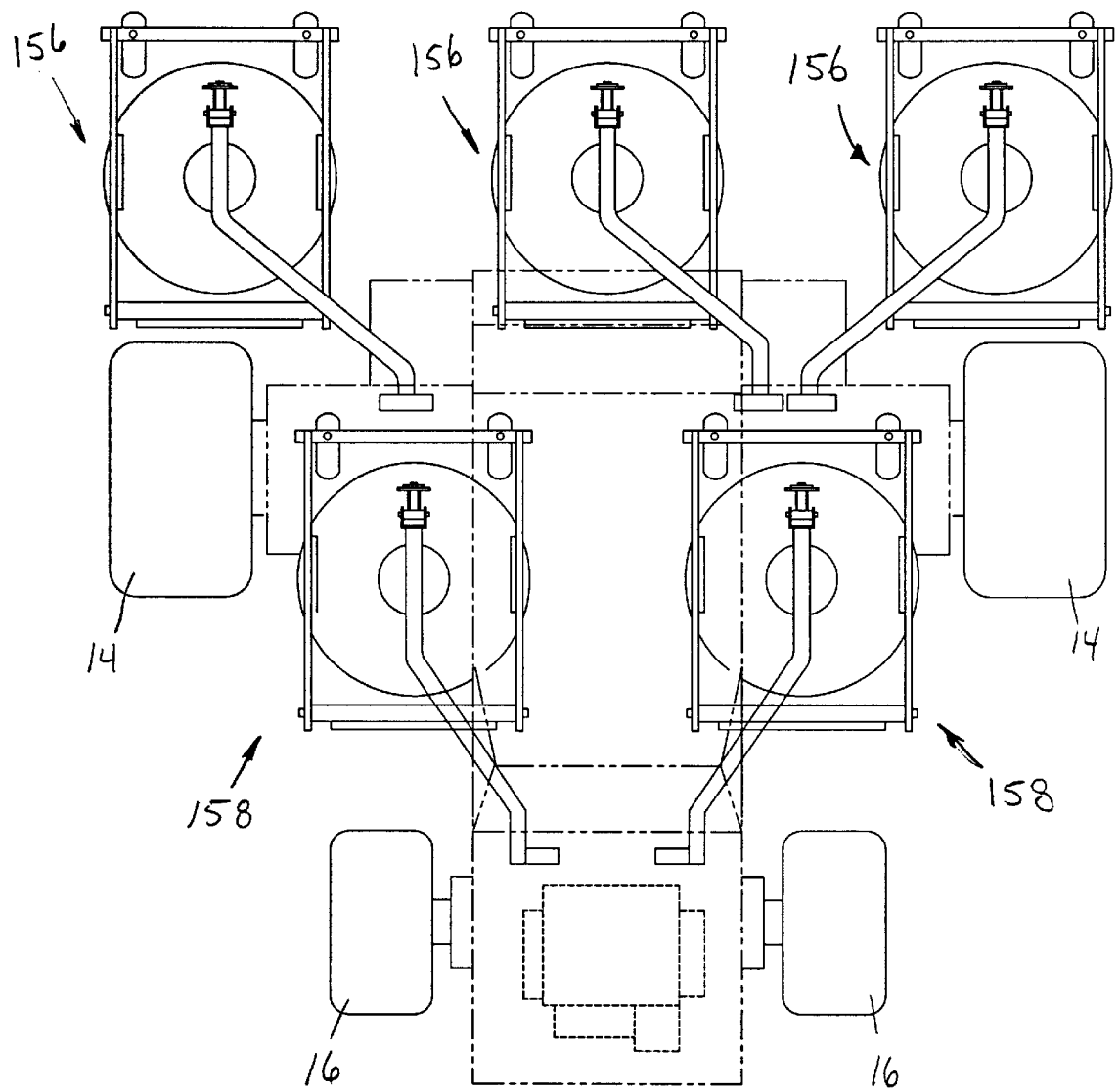
FIG. 8 is a top plan view of another embodiment of the present invention.

FIG. 8 depicts another lawn mower embodiment 154 having three forward cutting deck assemblies 156 and two rear cutting assemblies 158. Forward cutting assemblies 156 are aligned side-by-side spaced apart from one another forward of front wheels 14. Rear cutting deck assemblies 158 are also aligned side-by-side and spaced apart from one another. Rear cutting deck assemblies 158 are positioned between front wheels 14 in similar fashion to lawn mower 150 previously described.

With reference to FIGS. 9 and 10, each of the cutting deck assemblies 156 and 158 includes a single spindle mulching deck 160 defining a downwardly opening space. Deck 160 is supported by a pair of laterally spaced, generally vertically extending side plates 162 and 164. Two caster wheels 166 are pivotally coupled to a cross-arm 168 extending between side plates 162 and 164, such that each caster wheel 166 supports one of the side plates 162 and 164 and the deck 160 for movement over the ground. Each of the caster wheels 166 is coupled to cross-arm 168 via a caster shaft 170. Accordingly, each of caster wheels 166 may rotate about an axle shaft 172 and also pivot about caster shaft 170 when the vehicle is turning. A continuous, unitary roller 174 extends between side plates 162 and 164 and also supports side plates 162 and 164 and deck 160 for movement over the ground. In this embodiment, roller 174 is positioned behind deck 160 and extends substantially across the entire width of deck 160.

Each of the deck assemblies includes a lifting arm 176 to pivotally interconnect each of the deck assemblies with frame 12. Each lifting arm 176 includes a first end 178 pivotally coupled to deck 160 and a second end 180 pivotally coupled to frame 12. Specifically, first end 178 cooperates with a pin 182 to define an axis of rotation 184 extending laterally across deck 160 perpendicular to the forward-rearward direction of travel. Pin 182 rotatably couples second end 180 to a bracket 186. Bracket 186 is in turn pivotally coupled to a pair of stantions 188 extending from deck 160. A second pin 190 rotatably interconnects bracket 186 and stantions 188 for rotation about an axis 192 longitudinally extending in the forward-rearward direction of the mower 154.

Second end 180 of lifting arm 176 includes a third pin 194 pivotally interconnecting lifting arm 176 with frame 12. Pin 194 defines an axis 196 laterally extending across mower 154. As earlier described with reference to FIG. 5, a hydraulic assembly 148 connected between lifting arm 176 and frame 12 pivots the arm about axis 196 for lifting and lowering deck 160.

Figure 11:
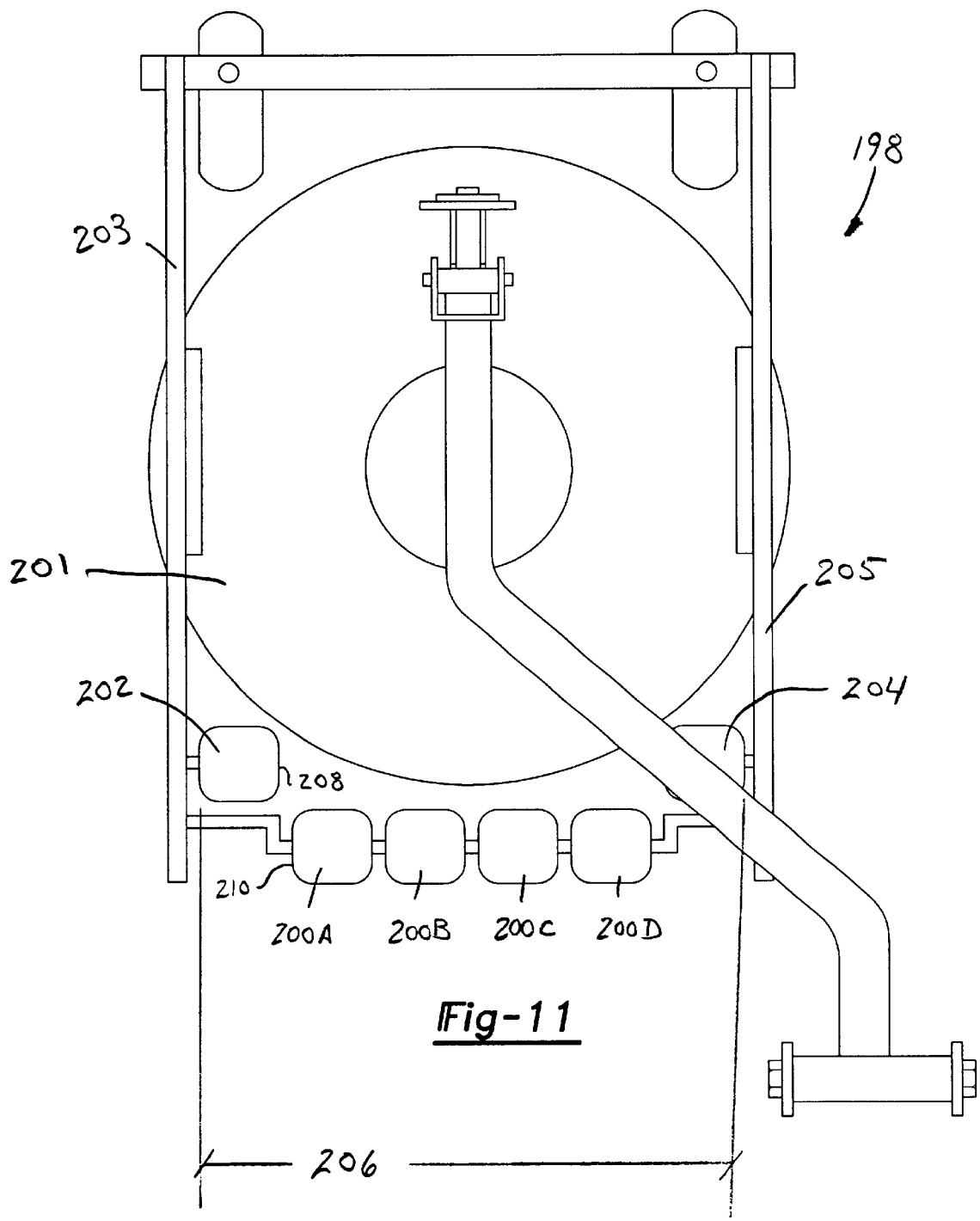
FIG. 11 is a top plan view of an alternate embodiment cutter deck assembly.

An alternate embodiment cutter deck assembly 198 is depicted in FIG. 11. A segmented first roller 200 is positioned behind a deck 201 laterally extending a distance less than the width of deck 201. Segmented roller 200 includes a plurality of roller segments 200A, 200B, 200C and 200D. It should be appreciated that segmented first roller 200 may include any number of roller segments without departing from the scope of the present invention. A second roller 202 is positioned forward of first roller 200. Second roller 202 is coupled to a side plate 203 and generally aligned with an outside edge of deck 201. A third roller 204 is aligned laterally with second roller 202 and positioned forward of first roller 200. Third roller 204 is coupled to a side plate 205 and generally aligned with an outside edge of deck 201. First roller 200, second roller 202 and third roller 204 are positioned to define a substantially uninterrupted rolling path 206 to provide an aesthetically pleasing striping of the grass. Second roller 202 and third roller 204 may be sized such that a portion of each of these rollers overlaps first roller 200. Alternatively, an inner edge 208 of second roller 202 may be aligned with an outer edge 210 of first roller 200 to provide the substantially uninterrupted roller path.

Figure 12:
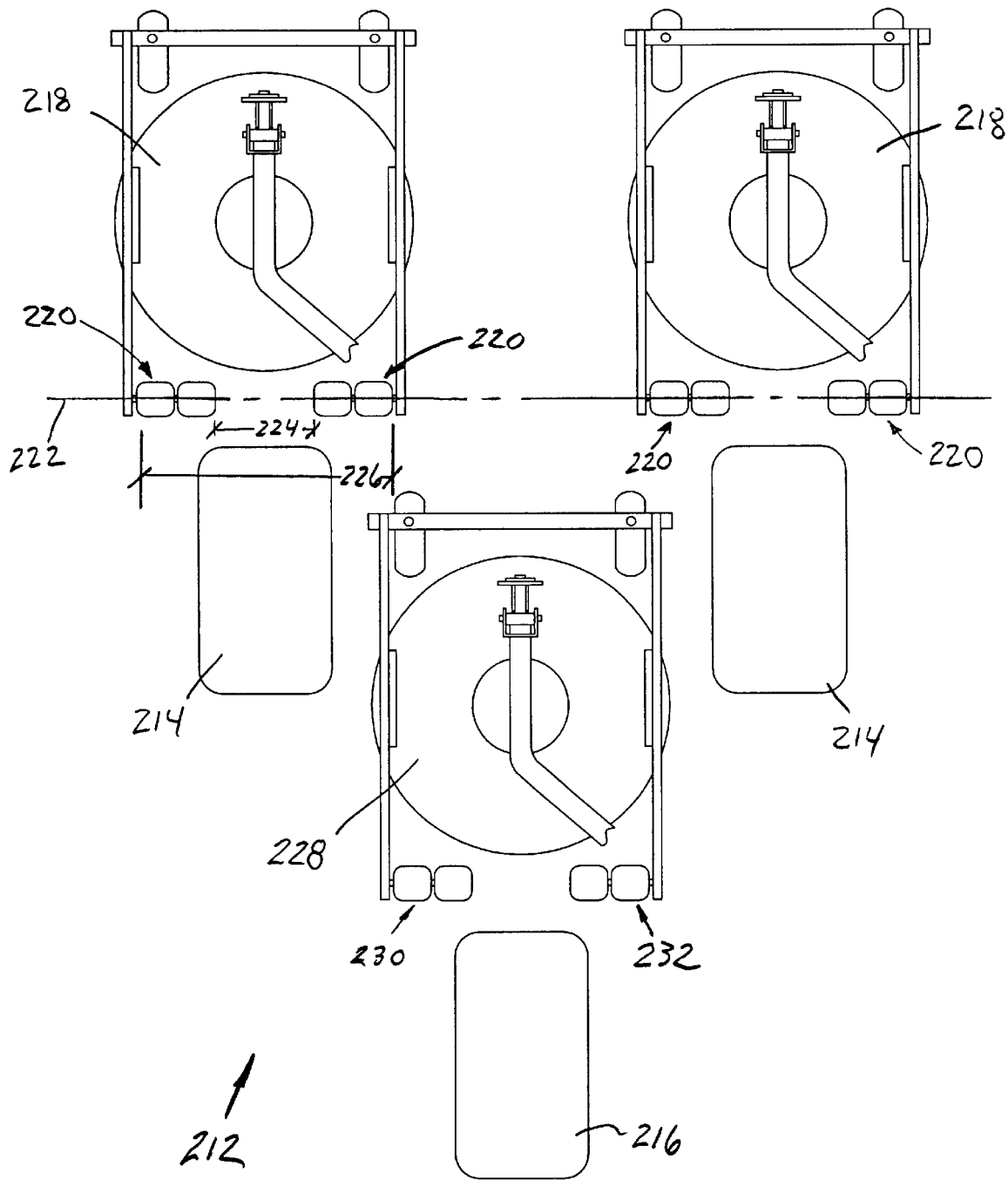
FIG. 12 is a top plan view of a three-wheeled lawn mower embodiment of the present invention.

With reference to FIG. 12, a three-wheeled mower 212 includes two forward wheels 214 and one rear wheel 216. Two forward cutting deck assemblies 218 are aligned with each of the wheels 214 in the longitudinal (forward-rearward) direction of travel and laterally aligned with each other. Each of cutting deck assemblies 218 includes a pair of segmented rollers 220 aligned along an axis of rotation 222 and laterally spaced apart from one another a predetermined distance 224. Each of the forward wheels 214 is aligned with the space between rollers 220 such that the combination of rollers 220 and wheel 214 form a rolling path 226 to provide the striping effect.

A rear cutting deck assembly 228 is positioned within the gap between forward cutting assemblies 218. Rear cutting deck assembly 228 is preferably laterally centered between forward cutting deck assemblies 218 to assure that all of the grass across the width of mower 212 is cut. In addition, forward cutting deck assemblies 218 are spread apart a distance less than the cutting width of rear cutting deck assembly 228 to further assure a complete width of cut when mower 212 is turning. Rear cutting deck assembly 228 is aligned with rear wheel 216 such that a first roller 230 and a second roller 232 cooperate with rear wheel 216 to stripe the grass.

Figure 13:
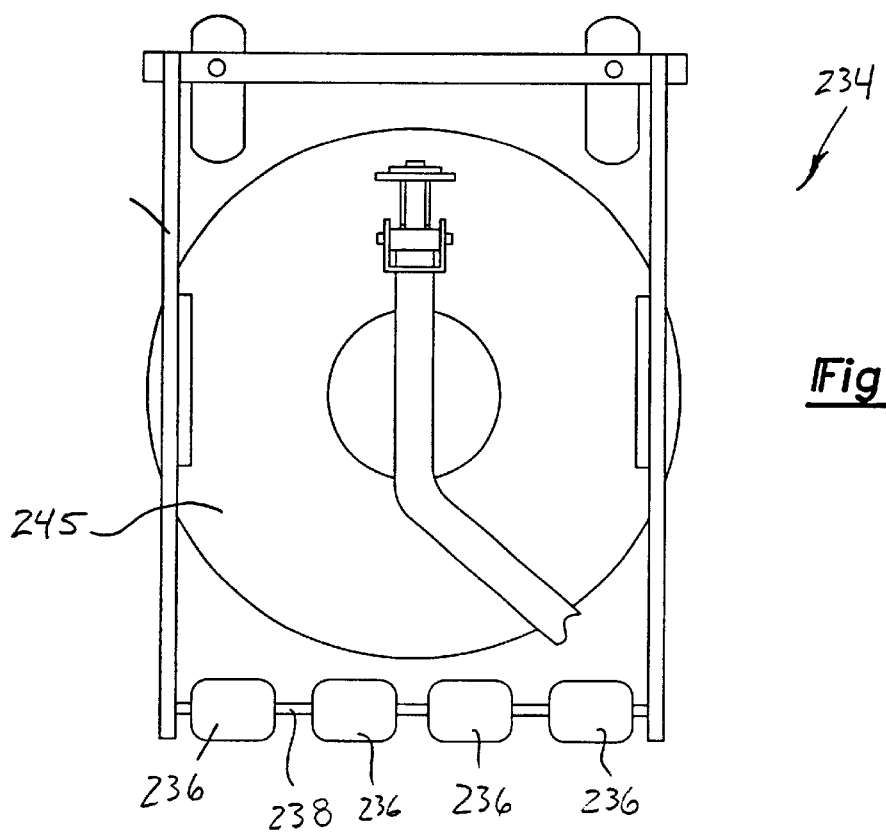
FIG. 13 is a top plan view of a cutter assembly having a segmented roller assembly.
Figure 14:
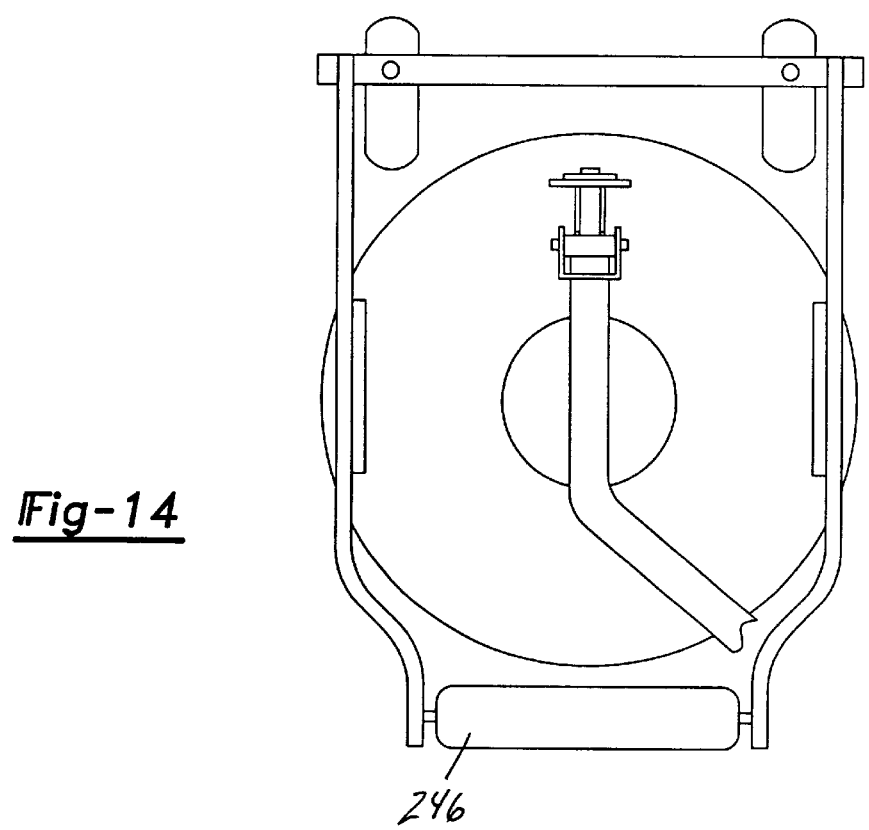
FIG. 14 is a top plan view of another embodiment of a cutter assembly.

Another cutting deck assembly is depicted at reference numeral 234 in FIG. 13. Cutting deck assembly 234 includes a plurality of separate rollers 236 aligned and rotatably mounted to axle 238. Axle 238 is coupled to a first side plate 242 and a second side plate 244. Accordingly, rollers 236 support the side plates and a deck 245 for movement over the ground. Rollers 236 are preferably axially spaced apart a predetermined distance along axle 238 to provide an alternate striping effect. It should be appreciated that rollers 236 are positioned such that they do not extend substantially across the entire width of a mower deck 245. In similar fashion and in reference to FIG. 14, a single one-piece unitary roller 246 may be incorporated to support the side plates and deck. Roller 246 does not extend the entire width of the mower deck.

Figure 15:
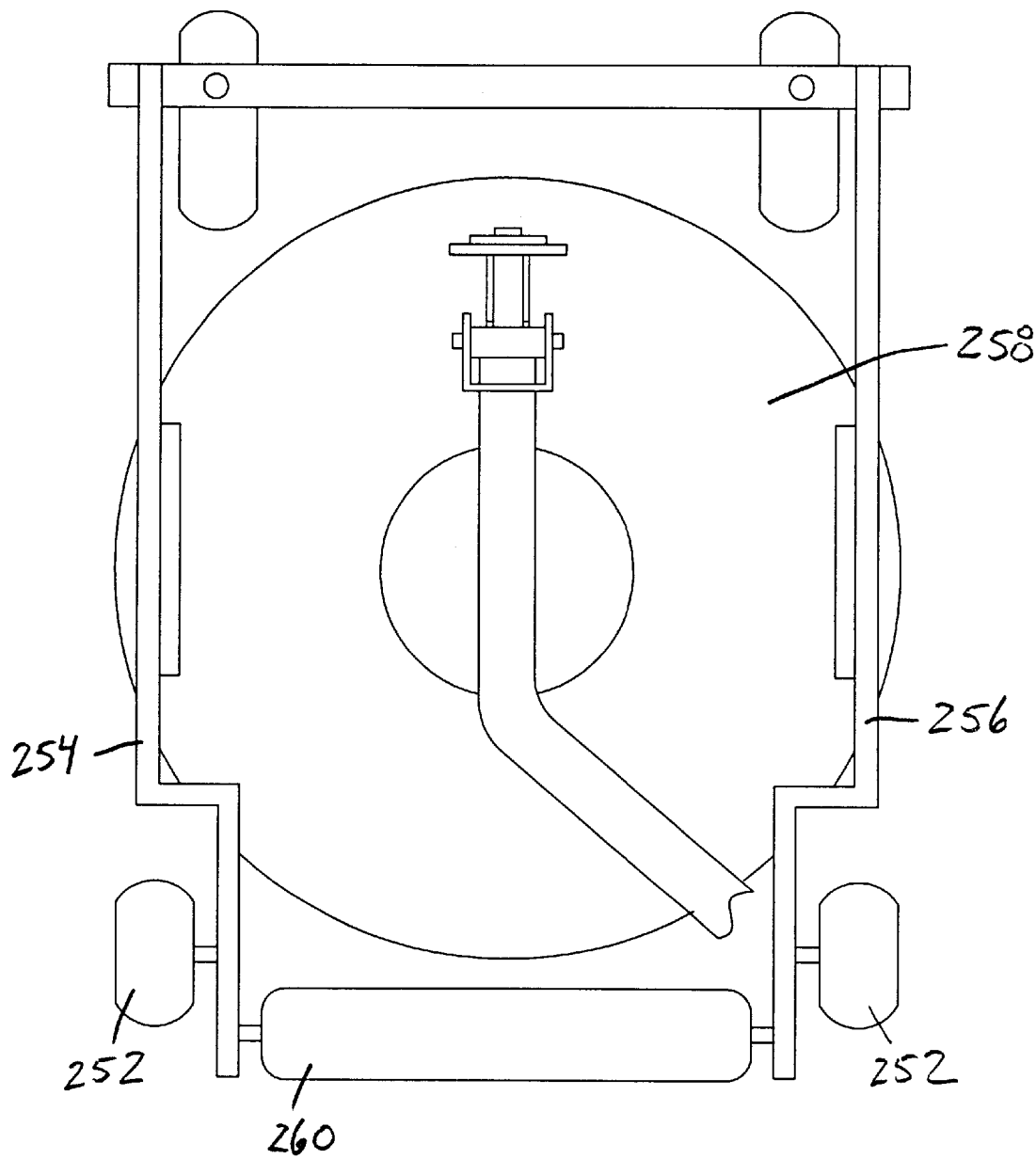
FIG. 15 is a top plan view of another cutter assembly embodiment.

As shown in FIG. 15, another embodiment 250 of a cutting deck assembly includes a pair of rear wheels 252 coupled to a pair of side plates 254 and 256, respectively. Rear wheels 252 function to support side plates 254 and 256 along with a mower deck 258 for movement over the ground. Additionally, cutter deck assembly 250 includes a unitary, one-piece roller 260 extending between side plates 254 and 256 a distance less than the entire width of deck 258.

Figure 16:
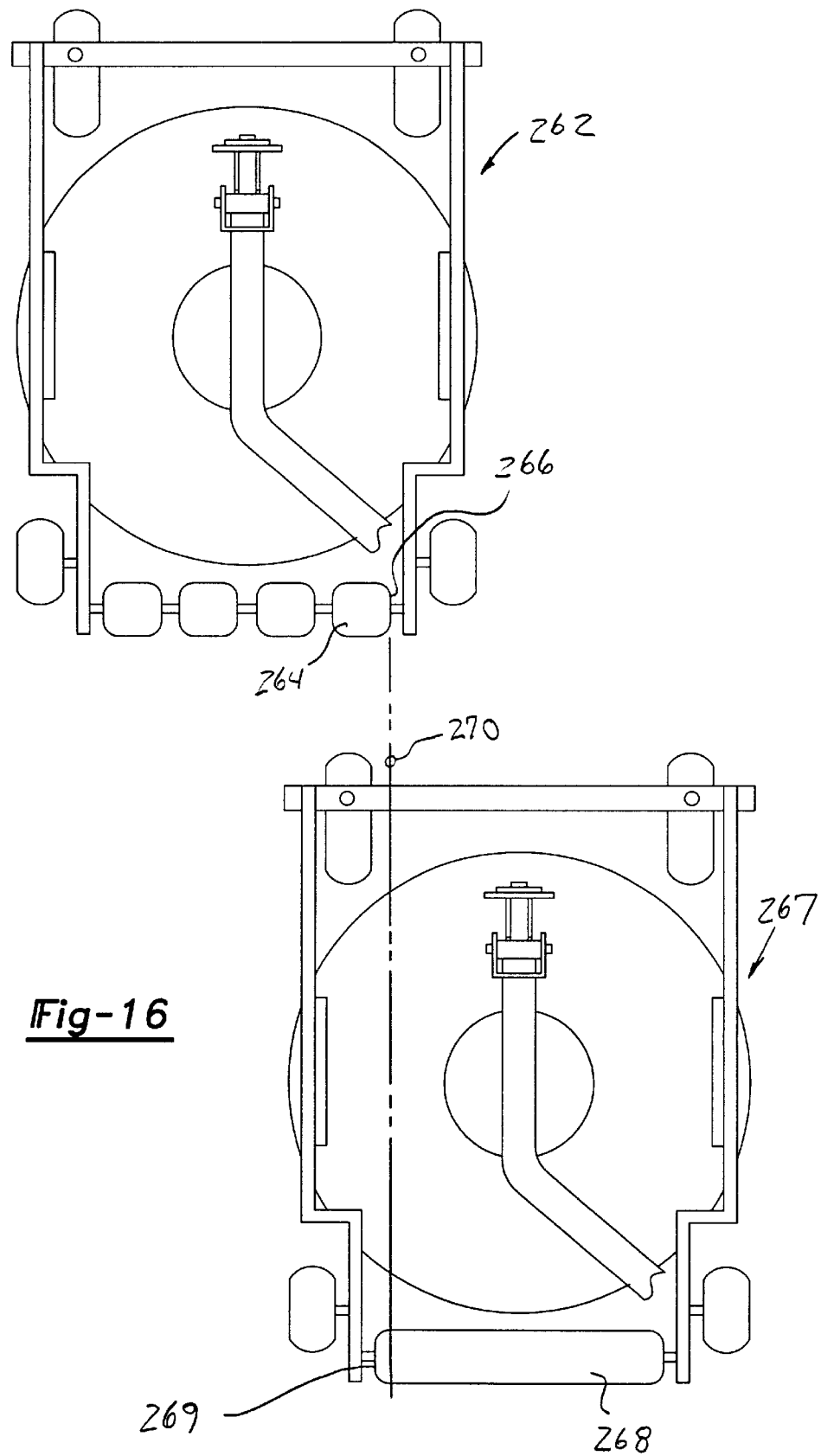
FIG. 16 is a partial top plan view of an alternate embodiment lawn mower.
Figure 17:
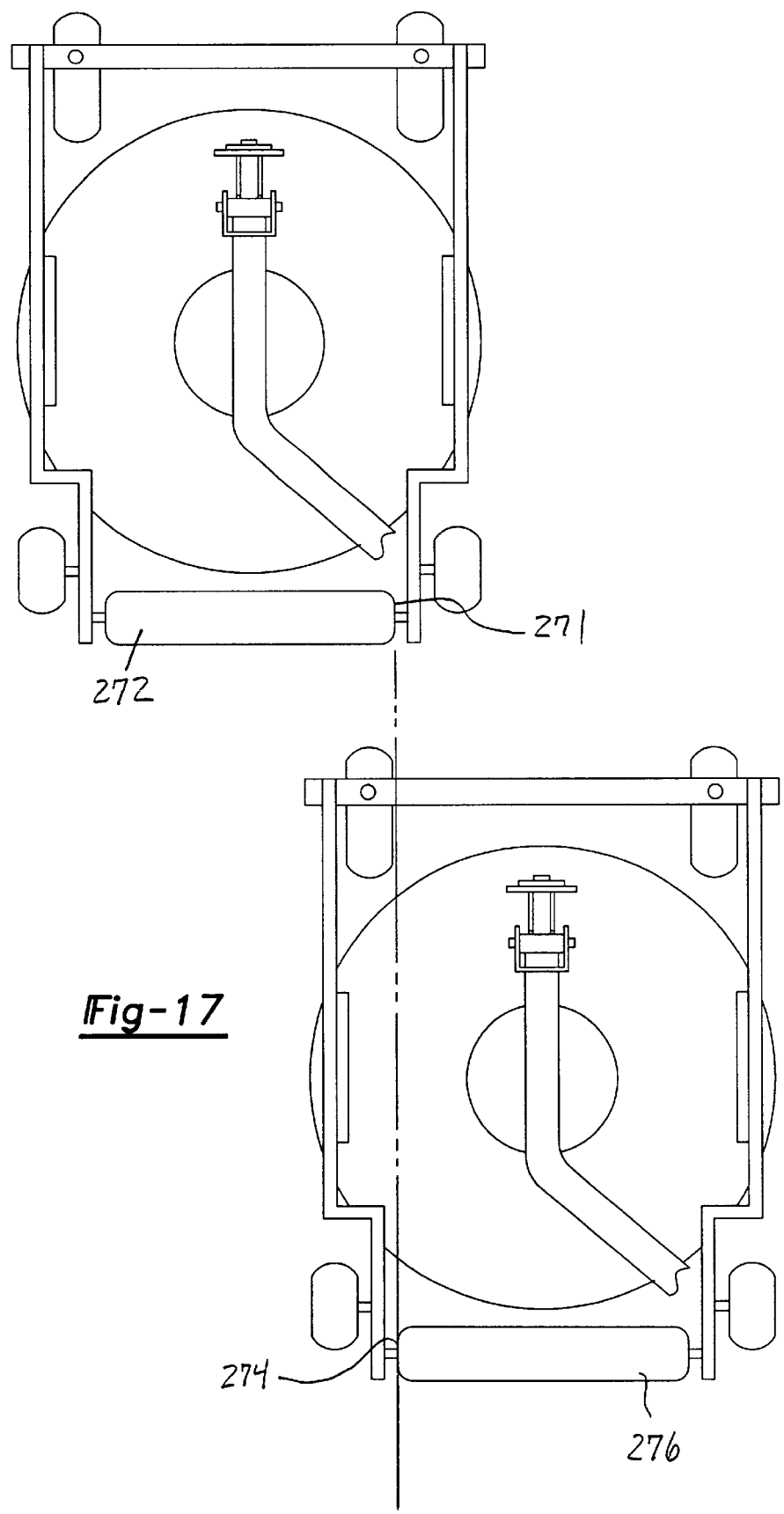
FIG. 17 is a partial top plan view of another alternate embodiment lawn mower.
Figure 18:
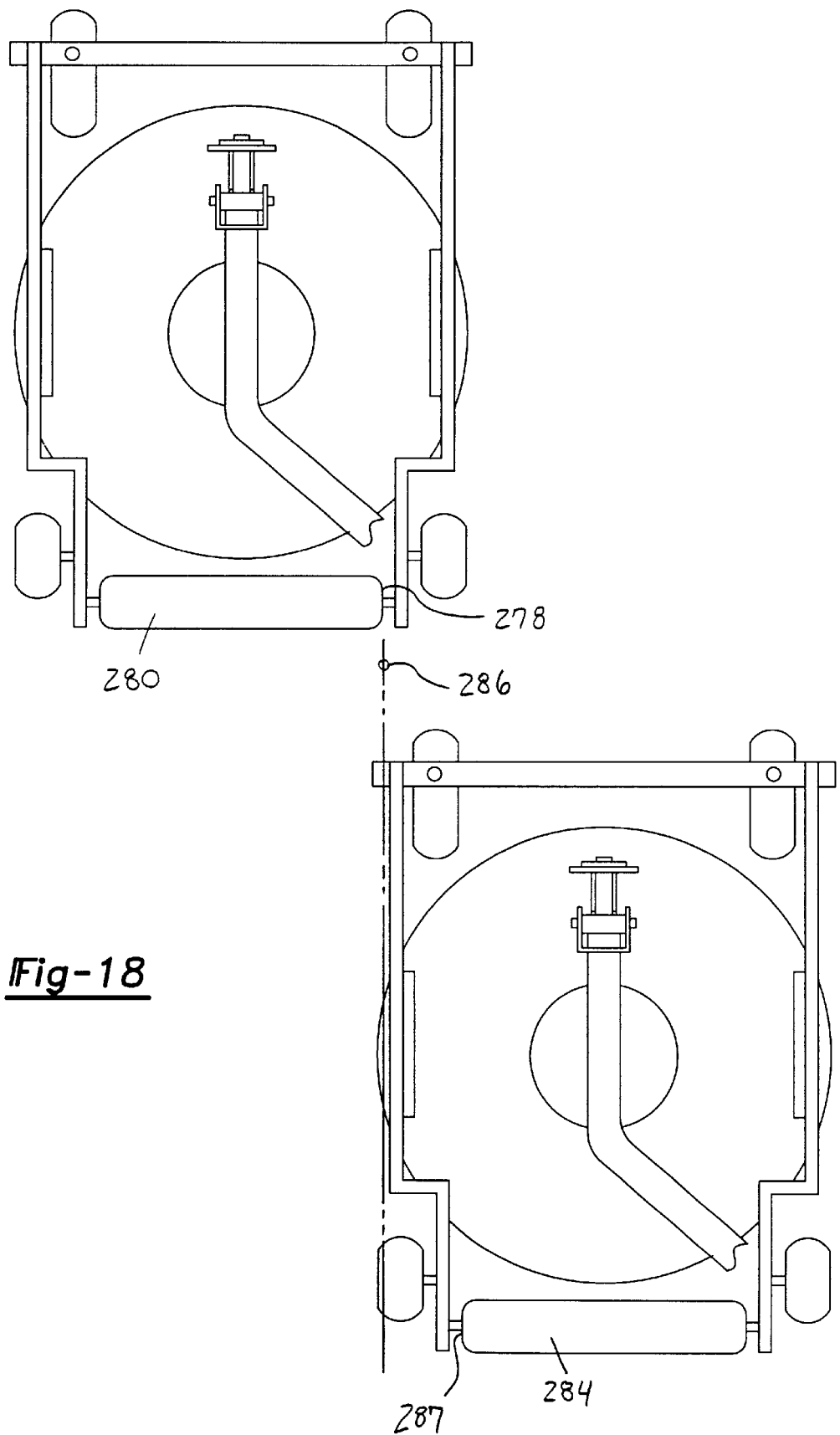
FIG. 18 is a partial top plan view of another alternate embodiment lawn mower.

Referring to FIGS. 16–18, each of the forward and rear cutting deck assemblies may be positioned relative to another in a number of ways. Specifically, a forward cutting deck assembly 262 includes a roller 264 having an inboard edge 266 which may be positioned in an overlapping relationship with a rear cutting deck assembly 267 having a roller 268 with an outboard edge 269. As phantom line 270 represents, inboard edge 266 of forward cutting deck assembly 262 overlaps outboard edge 269 of rear cutting deck assembly 267 to create the appearance of one continuous roller stripe.

Similarly, with reference to FIG. 17, an inboard edge 271 of a roller 272 may be longitudinally aligned with an outboard edge 274 of a roller 276. Accordingly, the cutting deck positions depicted in the Figure provide a substantially continuous roller stripe. As shown in FIG. 18, an inboard edge 278 of a roller 280 may be offset from an outboard edge 282 of a roller 284 as depicted by phantom line 286. In this manner, an interrupted stripe is formed in the grass as the rollers pass over.

Figure 19:
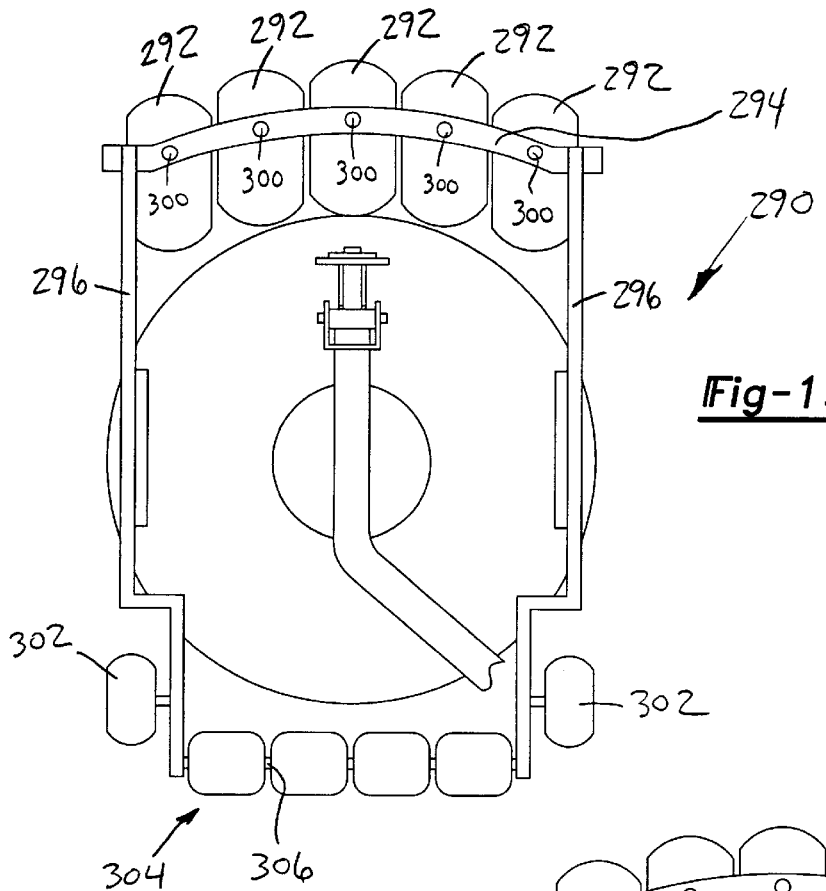
FIG. 19 is a top plan view of a cutter assembly having a plurality of front caster wheels.

Another cutting deck embodiment 290 is depicted in FIG. 19. Cutting deck assembly 290 includes a plurality of front caster wheels 292 pivotally coupled to a arcuate cross member 294 interconnecting a first side plate 296 and a second side plate 298. Each of front caster wheels 292 is pivotally coupled to cross member 294 via a caster pin 300. The plurality of caster wheels 292 provide an improved anti-scalp feature such that if any one of the caster wheels were to encounter a raised portion of turf, deck assembly 290 would be lifted to prevent the cutting blade from removing too much grass and scalping the turf. Cutting deck 290 also includes a pair of rear wheels 302 and a rear segmented roller assembly 304. Rear wheels 302 are pivotally coupled to each of the side plates 296 and 298. Each of the segments of segmented rear roller assembly 304 are rotatably coupled and aligned along an axle 306.

Figure 20:
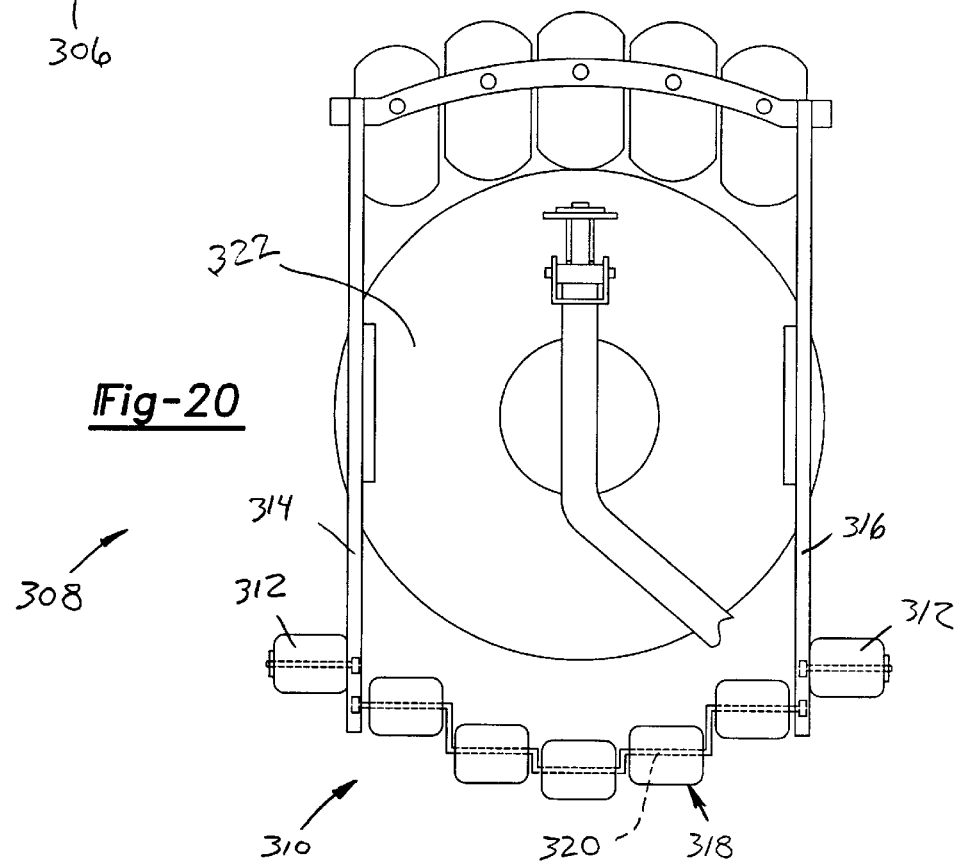
FIG. 20 is a top plan view of a cutter assembly having a "V" shaped rear roller assembly.
Figure 21:
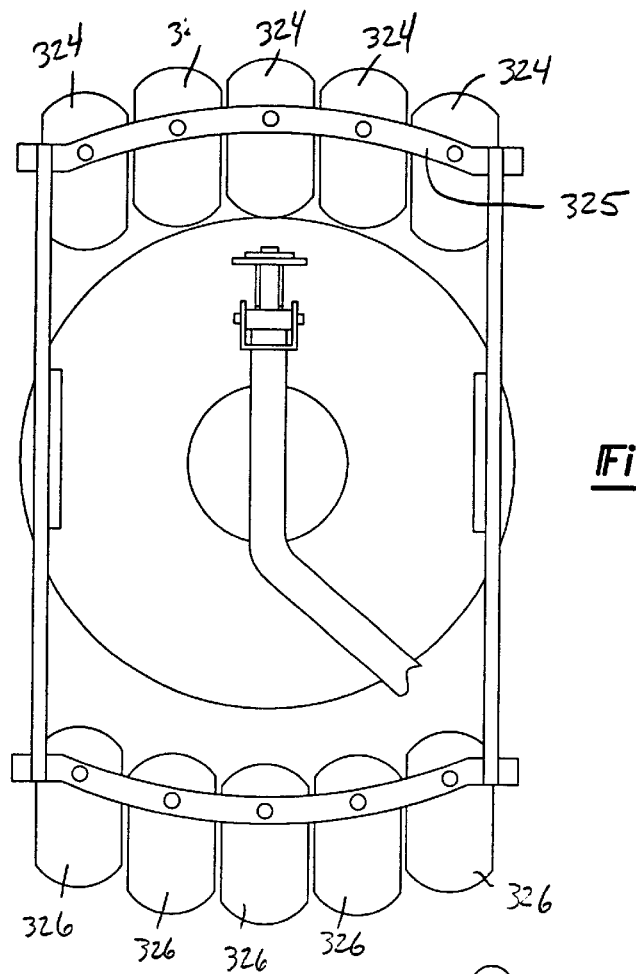
FIG. 21 is a top plan view of a cutter assembly having a plurality of front and rear caster wheels.

FIG. 20 depicts yet another cutting deck assembly 308 having a stepped and segmented rear roller assembly 310. Rear roller assembly 310 includes a pair of outboard rollers 312 coupled to side plates 314 and 316. Rear roller assembly 310 also includes an inboard set of rollers 318 positioned between side plates 314 and 316 and rotatably mounted on a stepped axle shaft 320. Rear roller assembly 310 provides a striped pattern having a width greater than the width of a deck 322.

Figure 22:
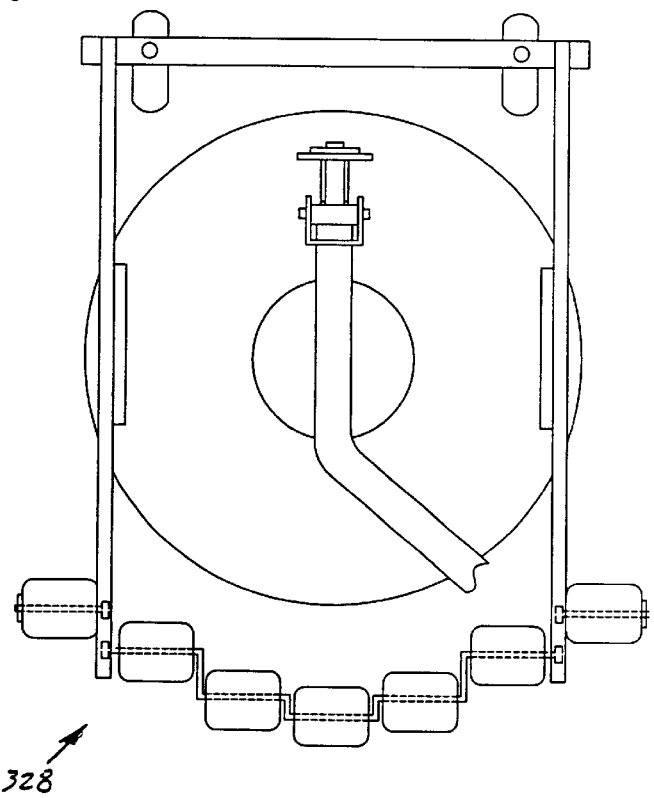
FIG. 22 is a top plan view of another embodiment of a cutter assembly.
Figure 23:
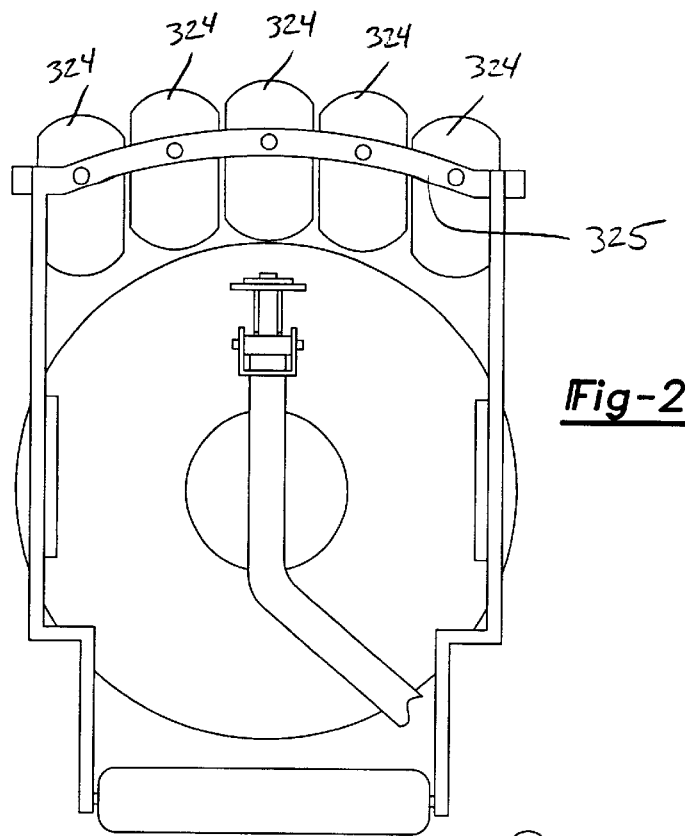
FIG. 23 is a top plan view of another embodiment of a cutter assembly.
Figure 24:
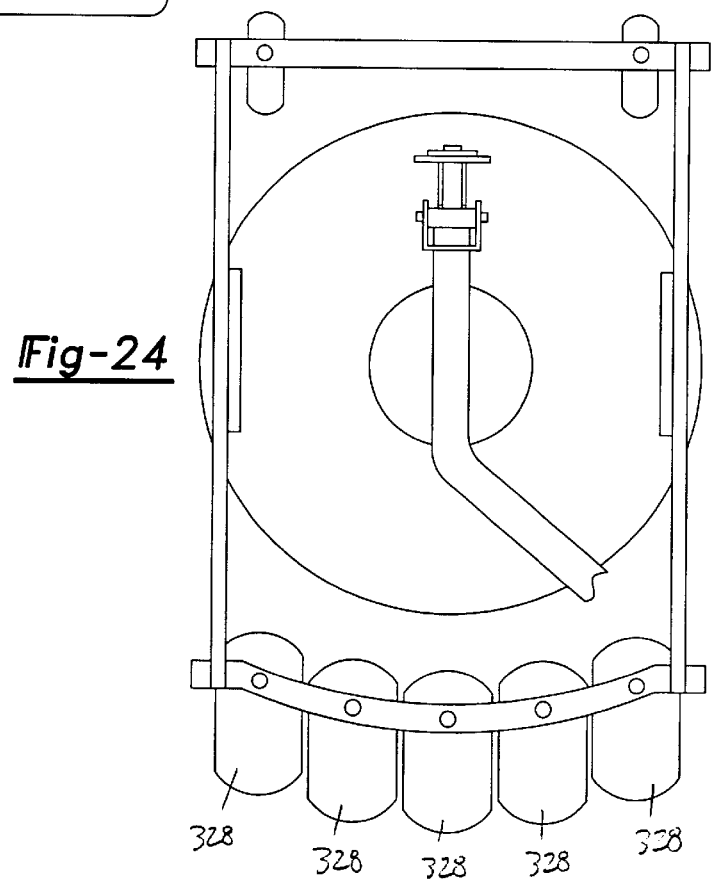
FIG. 24 is a top plan view of another cutter assembly embodiment.

FIGS. 21–24 depict additional cutting deck embodiments including various combinations of components previously introduced. Specifically, FIGS. 21 and 23 include a plurality of front caster wheels 324 pivotally mounted to a cross-member 325. The embodiment depicted in FIG. 21 includes a rearwardly mounted plurality of caster wheels 326 in lieu of a rear roller. FIG. 22 includes a "V" shaped offset, segmented roller assembly 328 similar to the assembly shown in FIG. 20 and depicted at reference numeral 310. Finally, FIG. 24 includes a rear plurality of caster wheels 328 similar to those shown in FIG. 21 at numeral 326.

It should be understood that any of the aforementioned lawn mowers may have two or more decks in the front row, and one or more cutting decks in the rear row. Also, other arrangements may be used to mount the decks to frame 12.

Various features of the invention are set forth in the following claims.

What is claimed is:

1. A gang-type rotary lawn mower comprising:
   a frame supported by front wheels and at least one rear wheel for movement over the ground;
   a power source which is mounted on said frame and which drives at least two of said wheels;
   an operator's seat mounted on said frame;
   a steering system enabling the operator to steer said lawn mower;
   at least two side-by-side front rotary cutting deck assemblies mounted on said frame in front of said front wheels, said front deck assemblies defining a gap between adjacent front deck assemblies; and
   at least one rear rotary cutting deck assembly mounted on said frame behind said front deck assemblies and between said front wheels, each rear deck assembly being aligned with a respective gap between adjacent front deck assemblies;
   each of said front and rear deck assemblies including a deck defining a downwardly opening space, at least one cutting blade mounted on a spindle for rotation therewith and a first roller supporting said deck for movement over the ground, said first roller extending only partially across the width of said deck.

2. The lawn mower of claim 1 wherein each of said front and rear deck assemblies further includes a second roller positioned in offset relation to said first roller.

3. The lawn mower of claim 2 wherein each of said front and rear deck assemblies further includes a third roller having an axis of rotation aligned with an axis of rotation of said second roller.

4. The lawn mower of claim 3 wherein each of said first, second and third rollers define a rolling path substantially uninterrupted across the width of the deck.

5. The lawn mower of claim 4 wherein said rolling path includes a portion traveled by both of said first and second rollers.

6. The lawn mower of claim 1 wherein each of said front and rear deck assemblies includes a second roller aligned with said first roller and spaced apart therefrom, said first and second rollers positioned on opposite sides of a respective wheel such that a rolling path is defined by said first roller, said second roller and said respective wheel.

7. The lawn mower of claim 6 wherein said rolling path extends substantially across the deck width.

8. The lawn mower of claim 1 wherein said first roller of said at least one front deck assembly defines a rolling path and said first roller of said corresponding at least one rear deck assembly defines a rolling path.

9. The lawn mower of claim 8 wherein said rolling path defined by said front deck assembly roller overlaps said rolling path defined by said rear deck assembly roller.

10. The lawn mower of claim 8 wherein said rolling path defined by said front deck assembly roller includes an inboard edge aligned with an outboard edge of said rolling path defined by said rear deck assembly roller.

11. The lawn mower of claim 8 wherein said rolling path defined by said front deck assembly roller is spaced apart from said rolling path defined by said rear deck assembly roller.

12. The lawn mower of claim 1 wherein each of said front and rear deck assemblies further includes a pair of rotatable wheels pivotally mounted to said frame.

13. The lawn mower of claim 12 wherein said rotatable wheels are mounted on a caster shaft.

14. The lawn mower of claim 1 further including a lifting arm pivotally interconnecting each of said front deck assemblies to said frame, said lifting arm pivoting about an axis laterally extending across said deck assembly substantially parallel to the ground and perpendicular to the direction of travel.

15. The lawn mower of claim 1 wherein said first roller is a unitary, one-piece roller.

16. The lawn mower of claim 1 wherein said first roller is a segmented roller having a plurality of roller segments.

17. The lawn mower of claim 16 wherein said roller segments are aligned along an axis of rotation.

18. The lawn mower of claim 16 wherein each of said roller segments is positioned in an offset manner from an adjacent one of said roller segments.

19. A cutting deck assembly for a gang-type rotary lawn mower having a frame, the cutting deck assembly comprising:

a deck defining a downwardly opening space;

at least one cutting blade mounted on a spindle for rotation therewith;

a pair of laterally-spaced, generally vertically extending side plates having forward ends;

a first front wheel supporting one of said side plates for movement over the ground;

a second front wheel supporting the other of said side plates for movement over the ground;

a roller extending between said side plates supporting said side plates for movement over the ground, wherein said deck is coupled to said side plates and located in front of said roller such that the height of said deck relative to the ground is adjustable by changing the position of said deck relative to said side plates; and a lifting arm adapted to pivotally interconnect said cutting deck assembly and the frame.

20. The lawn mower of claim 19 wherein said roller is a unitary, one-piece roller.

21. The lawn mower of claim 19 wherein said roller is a segmented roller having a plurality of roller segments.

22. The lawn mower of claim 21 wherein said roller segments are aligned along an axis of rotation.

23. The lawn mower of claim 21 wherein each of said roller segments is positioned in an offset manner from an adjacent one of said roller segments.

24. A gang-type rotary lawn mower comprising:

a frame supported by front wheels and at least one rear wheel for movement over the ground;

a power source which is mounted on said frame and which drives at least two of said wheels;

an operator's seat mounted on said frame;

a steering system enabling the operator to steer said lawn mower;

at least two side-by-side front rotary cutting deck assemblies mounted on said frame in front of said front wheels, said front deck assemblies defining a gap between adjacent front deck assemblies; and at least one rear rotary cutting deck assembly mounted on said frame behind said front deck assemblies, each rear deck assembly being aligned with a respective gap between adjacent front deck assemblies;

each of said front and rear deck assemblies including a deck defining a downwardly opening space, at least one cutting blade mounted on a spindle for rotation therewith and a first, second and third roller supporting said deck for movement over the ground, said first roller extending only partially across the width of said deck.

25. The lawn mower of claim 24 wherein said first roller and said second roller are positioned in along different axes of rotation.

26. The lawn mower of claim 25 wherein said third roller and said second roller rotate about the same axis of rotation.

27. The lawn mower of claim 26 wherein said second and third rollers are positioned forward of said first roller.

* * * * *

US006336312C1

(12) INTER PARTES REEXAMINATION CERTIFICATE (668th)
United States Patent
Bednar et al.

(10) Number: US 6,336,312 C1
(45) Certificate Issued: *Aug. 16, 2013

(54) GANG-TYPE ROTARY LAWN MOWER WITH MULTIPLE REAR ROLLERS

(75) Inventors: Richard D. Bednar, Johnson, RI (US); Randal S. Knurr, Waterford, WI (US)

(73) Assignee: Textron Innovations Inc., Providence, RI (US)

Reexamination Request:
No. 95/000,244, Apr. 26, 2007

Reexamination Certificate for:
Patent No.: 6,336,312
Issued: Jan. 8, 2002
Appl. No.: 09/643,697
Filed: Aug. 22, 2000

( * ) Notice: This patent is subject to a terminal disclaimer.

Related U.S. Application Data

(63) Continuation-in-part of application No. 09/546,145, filed on Apr. 10, 2000, which is a continuation of application No. 08/794,141, filed on Feb. 3, 1997, now Pat. No. 6,047,530.

(51) Int. Cl.
*A01D 34/66* (2006.01)
(52) U.S. Cl.
USPC .................................................. 56/6; 56/13.6

(58) Field of Classification Search
None
See application file for complete search history.

(56) References Cited

To view the complete listing of prior art documents cited during the proceeding for Reexamination Control Number 95/000,244, please refer to the USPTO's public Patent Application Information Retrieval (PAIR) system under the Display References tab.

*Primary Examiner* — Jeffrey R Jastrzab

(57) ABSTRACT

A gang-type rotary lawn mower including a frame supported by wheels for movement over the ground, a power source which is mounted on the frame and which drives at least two of the wheels, an operator's seat mounted on the frame, a steering system enabling the operator to steer the lawn mower, at least two side-by-side front rotary cutting deck assemblies mounted on the frame, the front deck assemblies defining a gap between adjacent front deck assemblies, and at least one rear rotary cutting deck assembly mounted on the frame behind the front deck assemblies, each rear deck assembly being aligned with a respective gap between adjacent front deck assemblies, each of the front and rear deck assemblies including a single-spindle mulching deck defining a downwardly opening space, a single spindle mounted for rotation about a generally vertical axis within the space, and at least one cutting blade mounted on the spindle for rotation therewith.

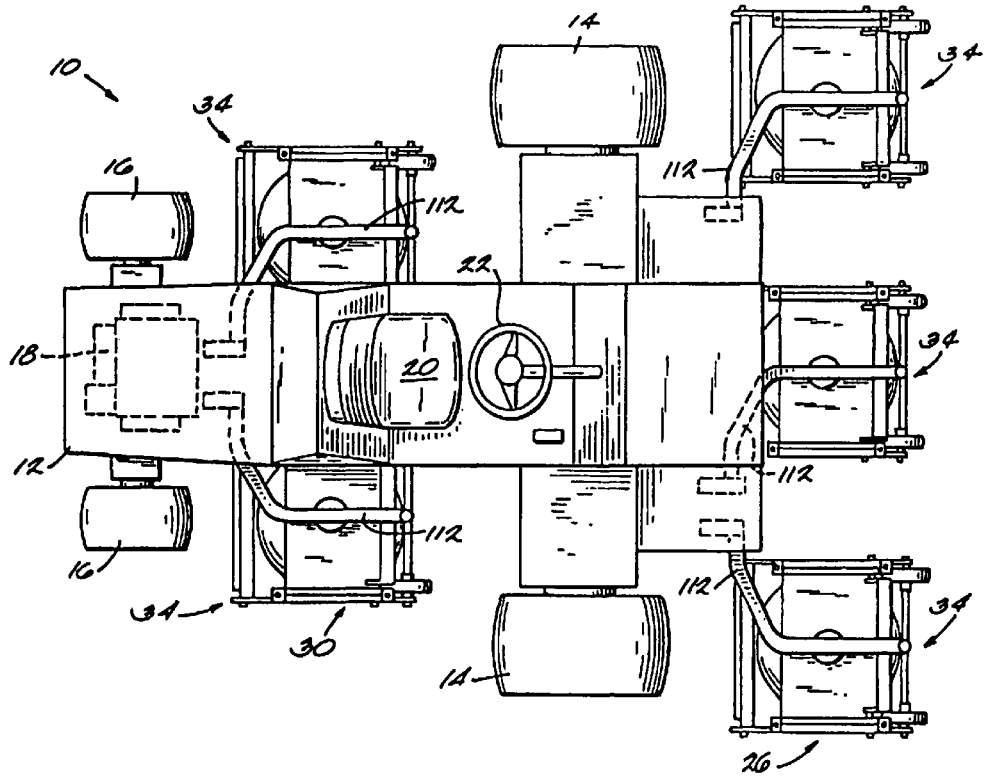

US 6,336,312 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3-5, 9, 14, 26 and 27 is confirmed.

Claims 1, 2, 8, 10, 15, 19, 20, 24 and 25 are cancelled.

New claims 28 and 29 are added and determined to be patentable.

Claims 6, 7, 11-13, 16-18 and 21-23 were not reexamined.

28. *A gang-type rotary mower comprising:*
   *a frame supported by wheels for movement over the ground,*
   *a power source which is mounted on the frame,*
   *an operator's seat mounted on the frame,*
   *a steering system enabling the operator to steer the lawn mower,*
   *at least two side-by-side front rotary cutting deck assemblies mounted on the frame, the front deck assemblies defining a gap between adjacent front deck assemblies, and*
   *at least one rear rotary cutting deck assembly mounted on the frame behind the front deck assemblies, each rear deck assembly being aligned with a respective gap between adjacent front deck assemblies,*
   *each front and rear deck assembly is connected to the frame for pivotal movement about a generally horizontal axis extending in the forward-rearward direction and for pivotal movement about a generally horizontal axis extending in the lateral direction; and*
   *each front and rear deck assembly comprises:*
   *a deck defining a downwardly opening space and comprising a first upwardly extending deck plate and a second upwardly extending deck plate laterally spaced from the first upwardly extending deck plate, wherein each deck plate comprises a first hole and a second hole vertically spaced from the first hole,*
   *a single spindle and at least one cutting blade mounted on the spindle for rotation therewith,*
   *a first generally vertically extending side plate and a second generally vertically extending side plate laterally spaced from the first side plate, wherein each side plate comprises a first hole and a second hole spaced from the first hole, and wherein each of the first and second generally vertically extending side plates is adjacent a corresponding first and second upwardly extending deck plate,*
   *a first front wheel supporting the first side plate for movement over the ground,*
   *a second front wheel supporting the second side plate for movement over the ground,*
   *a roller extending between the first generally vertically extending side plate and the second side plate supporting the side plates for movement over the ground, wherein the deck is coupled to the side plates and located in front of the roller such that the height of the deck relative to the ground is adjustable by changing the position of the deck relative to the side plates, and*
   *a lifting arm adapted to pivotally interconnect the deck assembly and the frame.*

29. *The gang-type rotary lawn mower of claim 28, wherein the cutting deck assembly further comprises:*
   *a first plate member positioned adjacent the first side plate and a second plate member positioned adjacent the second side plate, and*
   *a bolt extending through one of the holes in the first side plate, one of the holes in the first deck plate, and a hole in the first plate member, wherein the height of the deck relative to the ground is determined by selecting the hole in the side plate through which the bolt passes and the hole in the deck plate through which the bolt passes.*

* * * * *